United States Patent
Nevison

(10) Patent No.: US 10,760,390 B2
(45) Date of Patent: Sep. 1, 2020

(54) USE OF GASEOUS PHASE NATURAL GAS AS A CARRIER FLUID DURING A WELL INTERVENTION OPERATION

(71) Applicant: Halliburton Energy Services, Inc., Houston, TX (US)

(72) Inventor: Grant W. Nevison, Bragg Creek (CA)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/753,925

(22) PCT Filed: Sep. 8, 2016

(86) PCT No.: PCT/US2016/050663
§ 371 (c)(1),
(2) Date: Feb. 20, 2018

(87) PCT Pub. No.: WO2017/058484
PCT Pub. Date: Apr. 6, 2017

(65) Prior Publication Data
US 2018/0238153 A1     Aug. 23, 2018

Related U.S. Application Data

(60) Provisional application No. 62/235,256, filed on Sep. 30, 2015.

(51) Int. Cl.
*E21B 43/16* (2006.01)
*C09K 8/38* (2006.01)
(Continued)

(52) U.S. Cl.
CPC .............. *E21B 43/168* (2013.01); *C09K 8/38* (2013.01); *C09K 8/52* (2013.01); *C09K 8/524* (2013.01);
(Continued)

(58) Field of Classification Search
CPC .......... E21B 43/16; E21B 43/168; C09K 8/38
See application file for complete search history.

(56) References Cited

U.S. PATENT DOCUMENTS

| | | |
|---|---|---|
| 4,706,751 A | 11/1987 | Gondouin |
| 5,025,863 A | 6/1991 | Haines et al. |
| (Continued) | | |

FOREIGN PATENT DOCUMENTS

WO     2012097424 A1     7/2012

OTHER PUBLICATIONS

International Search Report and Written Opinion of PCT Application No. PCT/US2016/050663 dated Dec. 22, 2016: pp. 1-14.
International Search Report and Written Opinion of PCT Application No. PCT/US2016/050678 dated Sep. 8, 2016: pp. 1-14.

*Primary Examiner* — Crystal J Miller
(74) *Attorney, Agent, or Firm* — Chamberlain Hrdlicka

(57) ABSTRACT

Methods for servicing a hydrocarbon well using natural gas are provided. The method can include preparing a working fluid comprising about 5 vol % to about 100 vol % of natural gas. A quantity of the natural gas in the working fluid can be sufficient to form a heterogeneous phase well servicing mixture of a gaseous phase natural gas and a solid or liquid phase recovery target material under specified well intervention conditions. During the well servicing operation and under the specified well intervention conditions, the working fluid can be injected into the well and mixing the working fluid with the recovery target material in the well to form the heterogeneous phase well servicing mixture. The natural gas can be in a gas phase and can serve as a carrier fluid for the recovery target material. At least a portion of the heterogeneous phase well servicing mixture can be recovered at surface.

16 Claims, 7 Drawing Sheets

(51) Int. Cl.
  *C09K 8/594* (2006.01)
  *C09K 8/524* (2006.01)
  *C09K 8/52* (2006.01)
  *C09K 8/532* (2006.01)
  *C09K 8/536* (2006.01)
  *E21B 43/26* (2006.01)
  *C09K 8/70* (2006.01)
  *C09K 8/94* (2006.01)

(52) U.S. Cl.
  CPC .............. *C09K 8/532* (2013.01); *C09K 8/536* (2013.01); *C09K 8/594* (2013.01); *E21B 43/166* (2013.01); *E21B 43/26* (2013.01); *C09K 8/703* (2013.01); *C09K 8/94* (2013.01)

(56) References Cited

U.S. PATENT DOCUMENTS

| | | |
|---|---|---|
| 9,033,035 B2 | 5/2015 | Nevison |
| 2004/0149438 A1 | 8/2004 | Shaw et al. |
| 2006/0065400 A1 | 3/2006 | Smith |
| 2012/0129738 A1 | 5/2012 | Gupta et al. |
| 2013/0025870 A1 | 1/2013 | Berry et al. |
| 2013/0341010 A1* | 12/2013 | Nevison .................. E21B 43/26 |
| | | 166/250.01 |
| 2014/0008074 A1* | 1/2014 | Nevison .................. E21B 43/26 |
| | | 166/308.6 |
| 2014/0034322 A1 | 2/2014 | Gupta et al. |
| 2014/0262285 A1 | 9/2014 | Sethna et al. |

* cited by examiner

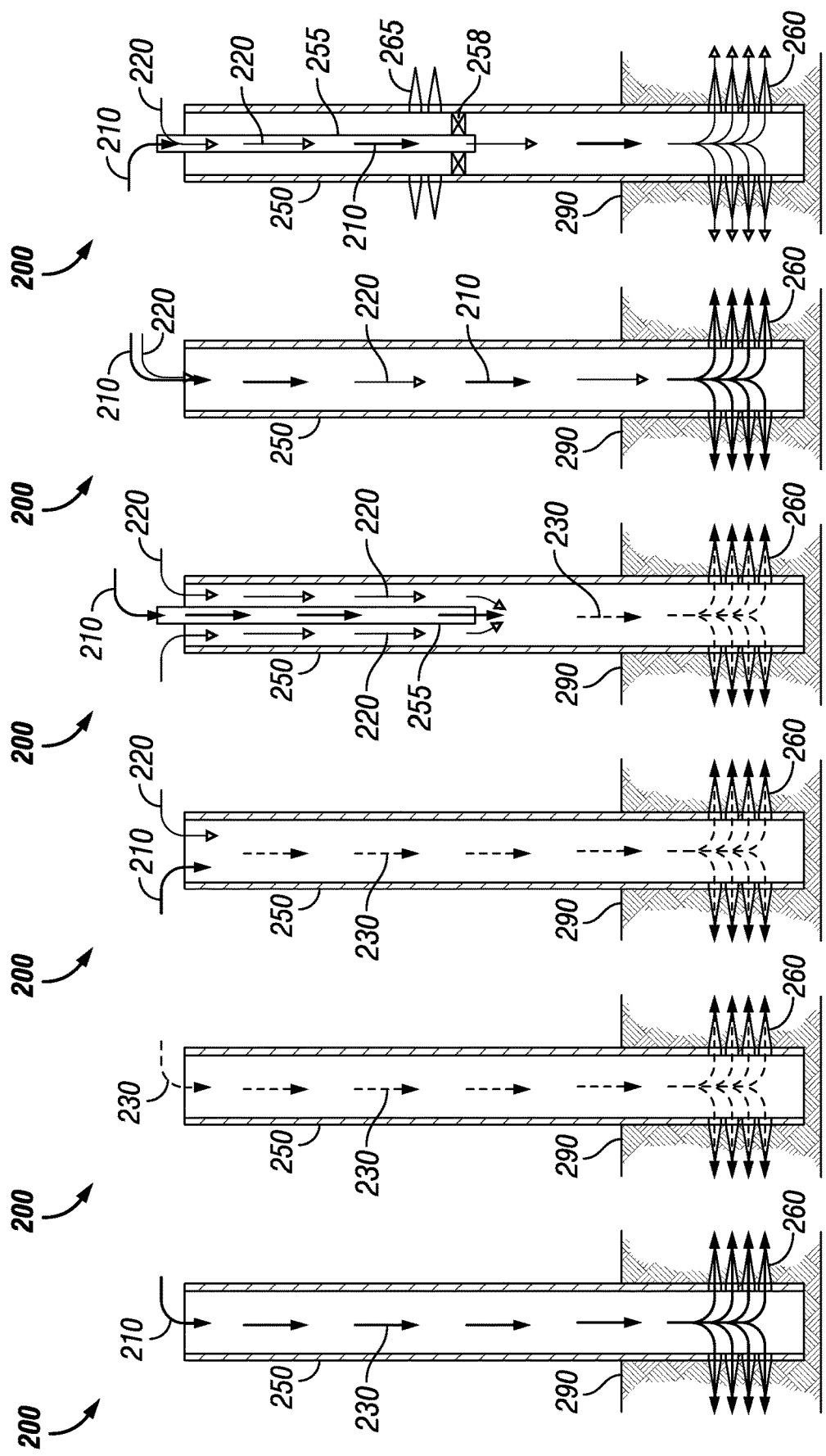

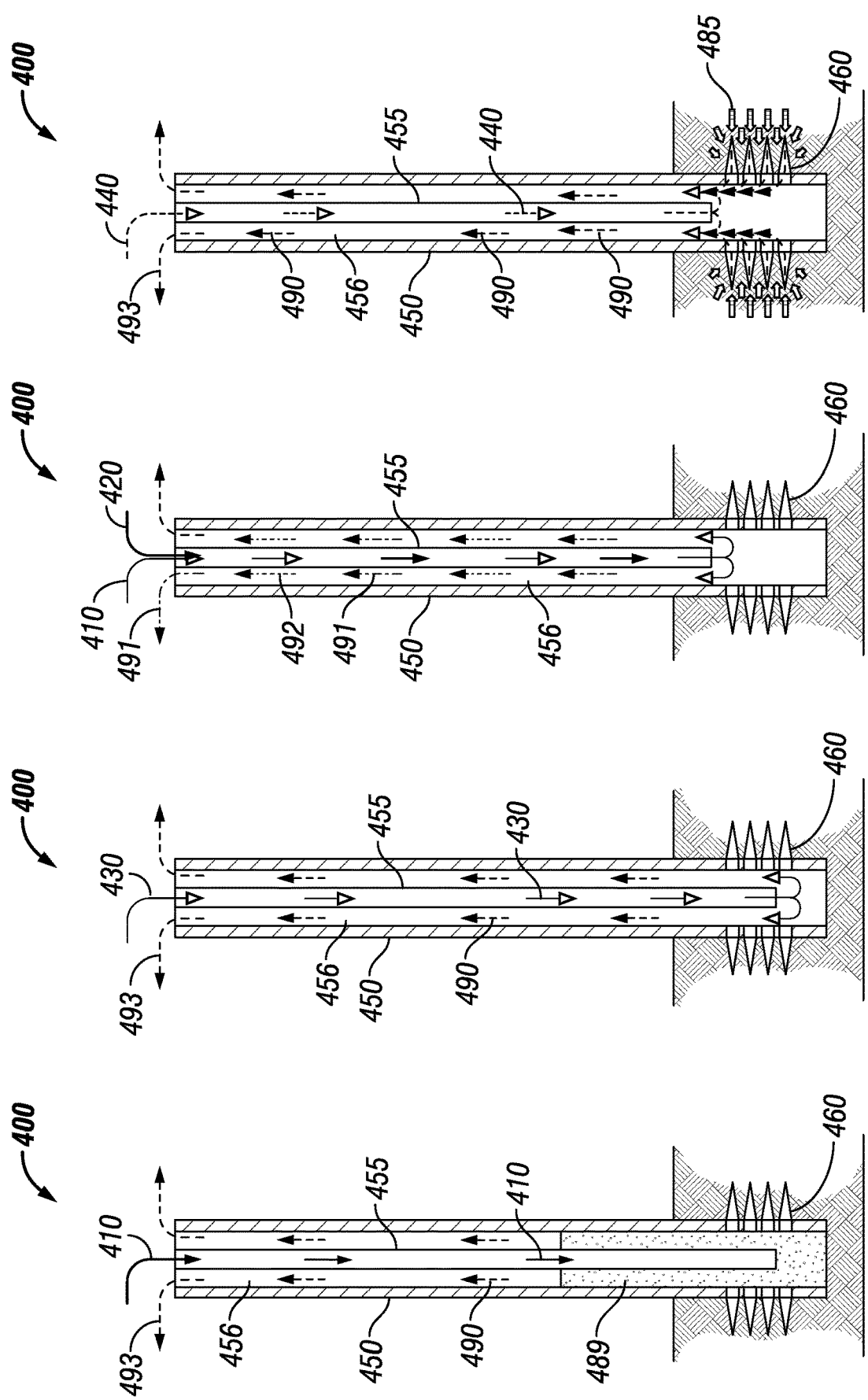

USE OF GASEOUS PHASE NATURAL GAS AS A CARRIER FLUID DURING A WELL INTERVENTION OPERATION

BACKGROUND

Well interventions are operations undertaken on oil or gas wells which alter the state of the well or wellbore, diagnose the well performance, or manage the production of the well. Well intervention operations can be applied to wells at any time following initial construction and can be applied to low rate wells, new wells, injection wells, and wells that are no longer producing. Well intervention operations include activities completed within or to the wellbore or surrounding reservoir.

The ability to effectively manage the physical properties and behavior of fluids during well intervention operations is becoming increasingly important. Efficient use of fluids will minimize applied volumes for reduced servicing and disposal costs and environmental impact while reduced or eliminated venting and flaring will reduce toxic emissions and greenhouse gases. Given the challenges with existing approaches to managing fluids used in well servicing operations, it is desirable to provide improvements to such existing approaches.

BRIEF DESCRIPTION OF THE DRAWINGS

Embodiments of the invention will now be described with reference to the accompanying drawings in which:

FIGS. 2A-2F are a schematic illustrations of different configurations for injecting natural gas and well servicing fluids into a well during a reservoir matrix well servicing operation, according to one or more embodiments.

FIGS. 4A-4D are schematics illustrating some configurations for circulating natural gas and well servicing fluids into a well during a circulation well servicing operation, according to one or more embodiments.

DETAILED DESCRIPTION

Figure 1:
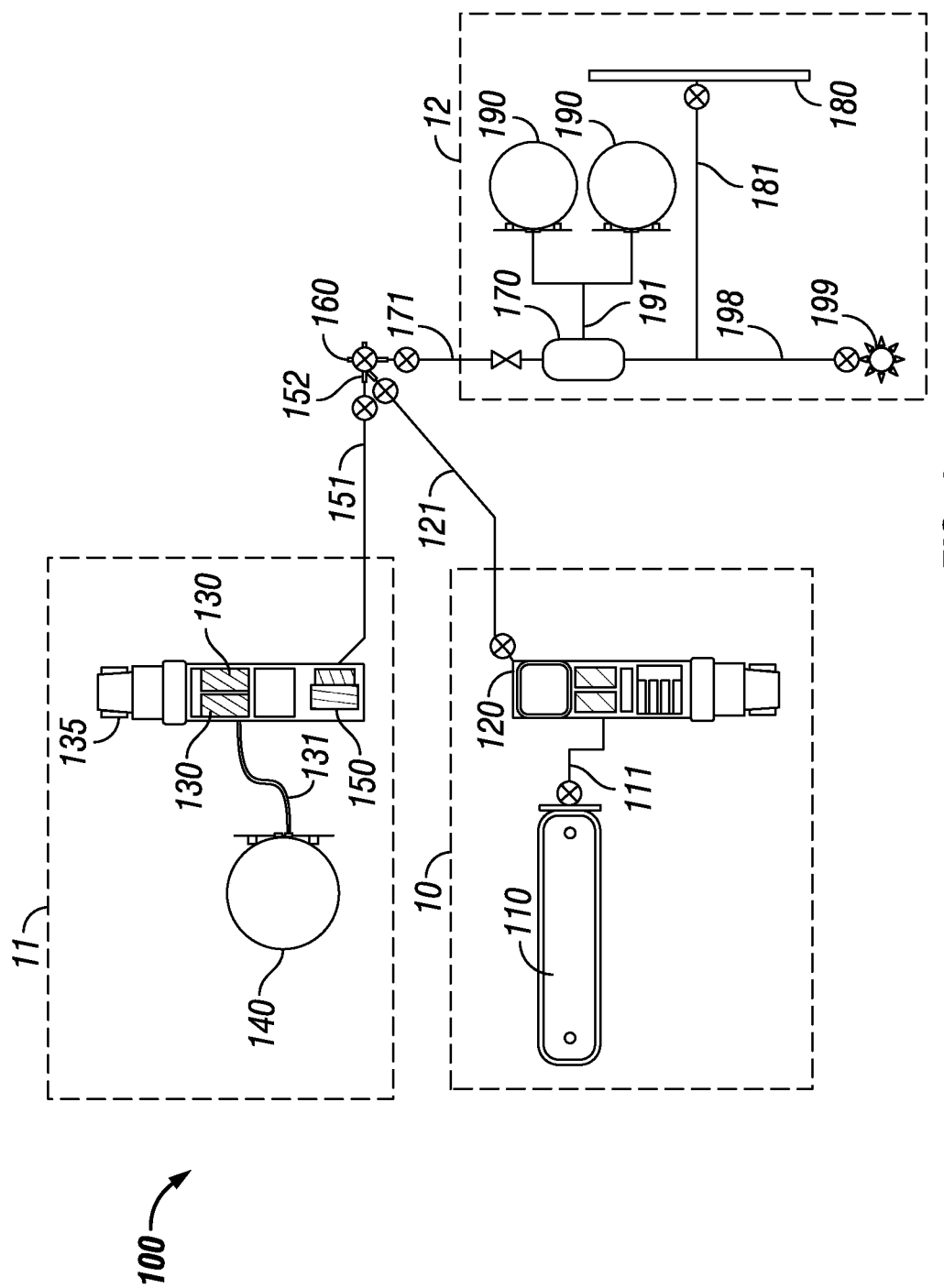
FIG. 1 is a generically depicted schematic of a well servicing system for injecting and recovering a working fluid containing natural gas into a wellbore or underground formation of a well, according to one or more embodiments.

The embodiments described herein relate generally to manipulating certain properties of a working fluid used during a well intervention or servicing operation to place or remove materials within a well, and to achieve certain behavior of a heterogeneous phase well mixture formed during the well servicing operation. Some embodiments disclose a method of servicing a well comprising injecting a working fluid comprising natural gas into a well and mixing the working fluid with a material in the well ("recovery target material") to form a heterogeneous phase well servicing mixture wherein the natural gas is in a gaseous phase. The recovery target material can be an unwanted material in the well, and the method further includes recovering the recovery target material along with at least a portion of the working fluid. In some embodiments, the working fluid includes a delivery target material such as a treating substance that causes at least one of a physical or chemical change in an unwanted material or a recovery target material in the well. The working fluid serves to place the delivery target material within a desired location in the well, and/or remove a recovery target materials from the well.

The working fluid can also be in a heterogeneous phase and formed at surface. The working fluid comprises gaseous phase natural gas, and optionally a well servicing liquid and/or a treating substance. The well servicing liquid can comprise an aqueous, organic or hydrocarbon liquid or mixtures thereof. Water or aqueous based servicing liquids include aqueous solutions which may contain dissolved components such as salts, acids (inorganic and organic), organics and alcohols. Organic well servicing liquids include alcohols, ketones, esters, amides, aldehydes, carboxylic acids and amides. Hydrocarbon well servicing liquids can comprise any hydrocarbon in a liquid state containing alkanes, alkenes, alkynes, aromatics, or any mixture thereof. Treating materials can comprise chemicals or materials in liquid or solid phase selected for placement within, or to assist with, mobilization of pre-existing materials in the wellbore or reservoir. Alternatively, the treating material may be selected for placement within, or to assist with, consolidation of materials, to accomplish plugging or isolation, or to manage deposition of materials within the wellbore or reservoir.

As used in this disclosure, natural gas means methane ($CH_4$) alone or blends containing methane and lesser amounts other compounds, such as, but not limited to, one or more gaseous and/or liquid hydrocarbons and/or one or more natural contaminants, as is typically found in and produced from wells and found in reservoirs. For example, a contaminant can be or include carbon monoxide, carbon dioxide, nitrogen, argon, or any mixture thereof. Natural gas can include about 70 vol %, about 80 vol %, or about 90 vol % to about 95 vol %, about 97 vol %, about 99 vol %, or about 100 vol % of methane and can include 0 vol %, about 1 vol %, about 3 vol %, or about 5 vol % to about 10 vol %, about 20 vol %, or about 30 vol % of one or more other compounds. For example, natural gas can include about 70 vol % to about 100 vol %, about 70 vol % to about 99 vol %, or about 80 vol % to about 95 vol % of methane and about 0 vol % to about 30 vol %, about 1 vol % to about 30 vol %, about 5 vol % to about 20 vol % of one or more of ethane ($C_2H_6$), propane ($C_3H_8$), butane ($C_4H_{10}$), pentane ($C_5H_{12}$), longer chain hydrocarbons, isomers thereof, or any mixture thereof.

Natural gas composition varies widely depending upon its source and degree of processing. Raw natural gas may contain significant quantities of naturally occurring contaminants, including carbon dioxide, nitrogen, hydrogen sulfide, hydrogen, oxygen, or any mixture thereof and each contaminant can have a concentration up to 50 vol %. Further, it may contain water vapor to saturation often at levels exceeding 100 mg/m³. Comparably, processed natural gas is much less variable in composition. Contaminants are typically removed to almost trace levels as are the longer hydrocarbon chains of $C_5+$. Processed natural gas can include about 87 vol % to about 97 vol % of methane, about 1.5 vol % to about 7 vol % of ethane, about 0.1 vol % to about 1.5 vol % of propane, about 0.01 vol % to about 1 vol % of butanes, about 0.01 vol % to about 1 vol % of pentane, less than 0.06 vol % of each longer chain hydrocarbon. Processed natural gas can include nitrogen gas at a concentration of up to 15 vol %, for example, about 5 vol % of less of nitrogen gas. Processed natural gas can include carbon dioxide at a concentration of up to 2 vol % and trace amounts of oxygen, hydrogen, hydrogen sulfide, or any mixture thereof. Processed natural gas can include water at a concentration of less than 32 $mg/m^3$. Processed natural gas can have a heating value of about 36 $MJ/m^3$ to about 40 $MJ/m^3$ on a dry basis. The most consistent processed natural gas is liquefied natural gas (LNG). Within North America, LNG can include 95 vol % or more of methane and less than 5 vol % total of ethane, propane, butane, or any mixture thereof, and only trace amounts of pentane and longer chain hydrocarbons. Nitrogen may be present in small quantities, less than 2 vol %, with carbon dioxide and water present at less than 50 ppm. Internationally, LNG may contain less than 85 vol % of methane with up to 15 vol % of ethane, over 2 vol % of propane and 1.5 vol % of butanes, and only traces of pentane and longer chain hydrocarbons. Again, nitrogen may be present in small quantities, less than 1 vol %, with carbon dioxide and water present at less than 50 ppm. LNG is a cryogenic liquid typically stored at −160° C. and near atmospheric pressure, usually not to exceed 700 kPa. Natural gas has a critical temperature of about −80° C.

The volume of natural gas within the gas phase in the working fluid can be about 5 vol % to about 100 vol %; in embodiments where the working fluid includes a delivery target material such as a treating substance, the volume of natural gas within the gas phase in the working fluid can be about 5 vol % to about 99 vol %.

Some embodiments of the method further comprise the following steps: determining a well servicing requirement and certain well servicing conditions within the well; selecting a desired behavior of the heterogeneous phase well servicing mixture during the servicing operation in the well under the determined servicing conditions; determining the properties of the working fluid required to achieve the desired behavior, including selecting the composition and quantity of natural gas in the working fluid to form the desired heterogeneous phase well servicing mixture; preparing the working fluid and injecting the prepared working fluid into the well to form the desired heterogeneous phase well servicing mixture at the servicing conditions; and then recovering and capturing a recovery stream as the servicing effluent at the determined recovery conditions. The well servicing requirements can include identifying a delivery target material and/or a recovery target material. The well servicing conditions can be or include, but are not limited to, reservoir temperature and pressure, reservoir fracturing pressure, surface recovery pressure, servicing depth wellbore configuration and geometry, or any combination thereof. The selected desired behavior of the heterogeneous phase well servicing mixture can be or include, but is not limited to, target material placement or removal identification, free natural gas volume, dissolved natural gas content, mixture density and total mixture volume, or any combination thereof. The determined properties of the working fluid can also include well servicing injection pressure and temperature, and recovery pressure.

Solubility of the natural gas within the injected working fluid or formed heterogeneous phase well servicing mixture is at most moderate at the servicing conditions such that servicing fluid stream exists in an oversaturated state and a free gas volume is present. Injection into the well is at selected injection or circulation pressures and temperatures to provide the desired pressure and temperature at the servicing point within the well to promote the desired behavior at the servicing conditions. As will be discussed in greater detail below, the composition and quantity within the mixture of all of the well servicing fluid, the target material, the well contents, and the reservoir fluids, along with the composition and quantity of natural gas, in conjunction with the servicing injection and recovery conditions are manipulated to produce the desired behaviors of the working fluid and well servicing mixture during the well servicing steps. The quantity of free natural gas in the formed mixture and the temperature and injection/circulation pressure can be manipulated so that the mixture has the desired heterogeneous behaviors during the well servicing operation. The mixture behaviors can include a particular free gas phase, density, volume, and/or dissolved gas content. This method is undertaken with the objective of improving performance of the servicing operation.

When the selected desired behavior is free gas volume, the method in one aspect can further comprise determining the natural gas solubility in the well servicing mixture, having the selected quantity of natural gas in the mixture, and injecting/circulating the well servicing mixture into the wellbore or reservoir of a well at a selected injection pressure and injection temperature such that the mixture comprises a desired free gas volume at the servicing conditions within the wellbore or reservoir, and wherein at least a portion of the gaseous phase natural gas can be undissolved in the well servicing liquids during recovery. In this aspect, the injection pressure and temperature and recovery pressure can be selected so that the injected/circulated mixture, or the mixture produced within the wellbore, is oversaturated with natural gas at the servicing point within the well and the recovery point. When the selected desired behavior is mixture density, the method can further comprise determining the required quantity of free natural gas in the mixture for a desired density of the well servicing stream mixture during the well servicing operation. When the selected desired behavior is total volume, the method can further comprise determining the required natural gas volume in the mixture for a desired total volume of the well servicing stream mixture during the well servicing operation. When the selected desired behavior is dissolved natural gas content, the method can further comprise determining the required quantity of dissolved natural gas in the mixture for a desired free gas content within the well servicing stream mixture during the well servicing operation.

As used in this disclosure, the following meanings are ascribed to the following terms. The delivery target material means a treating material to be placed within a well during a well servicing operation. The recovery target material means a material to be removed from the well during a well servicing operation, including unwanted materials. The working fluid is the fluid injected at surface comprising between 5 vol % and 100 vol % natural gas in gaseous form and optionally comprising either or both a treating material and a well servicing liquid. The well mixture is a homogeneous phase mixture of the working fluid less any target delivery material, and when applicable, the recovery target material. The well mixture can also include products from a treating material reaction or dissolution, and optionally reservoir sourced materials. The recovery stream is the well servicing effluent as recovered at surface at the recovery conditions.

As used in this disclosure, the well servicing liquids can be or include, but are not limited to, fresh water, other aqueous based liquids, organic liquids, hydrocarbon liquids or combinations thereof as are commonly applied in well servicing operations. Water or aqueous based well servicing liquids include aqueous solutions which may contain dissolved components such as salts, acids (inorganic and organic) and other water soluble organic materials.

As used in this disclosure, hydrocarbon well servicing liquids means any hydrocarbon in a liquid state at the servicing conditions containing alkanes, alkenes and or aromatics. The hydrocarbon compositions may include hydrocarbons or hydrocarbon blends having carbon chain lengths primarily from two carbons, $C_2$, through to fifty carbons, $C_{50}$. Preferentially, the hydrocarbon liquid will be of a composition such that the volatility will be suitable for completion of safe well servicing operations, such as those liquids with volatility below a Reid vapor pressure of 2 psi. Alternatively, higher Reid vapor pressure liquids or liquefied petroleum gases may be applied; however, special equipment or procedures may be required for safe application. Further, the preferential hydrocarbon liquid will not contain detrimental quantities of asphaltene, bitumen or paraffin which may have adverse effects to the wellbore, reservoir or servicing operation.

As used in this disclosure, treating materials can comprise chemicals or materials selected for placement within, or to assist with, mobilization of materials from the wellbore or reservoir. This is accomplished by loosening, dispersing, reacting or in some manner altering the state of the material contained within the well and to be removed. Alternatively, the treating material may be selected for placement within, or to assist with, consolidation of materials, or to accomplish plugging or isolation within the wellbore or reservoir. Treating chemicals or treating materials, referred to collectively as the treating material, can be or include, but are not limited to, water, aqueous solutions of salts, organic materials, acids and acid blends, hydrocarbon liquids, natural gas, natural gas liquids, hydrocarbon solvents, biocides, gellant breakers, pH buffers, pH control, clay stabilizers, crosslinkers, gellant viscosifiers, friction reducers, non-emulsifiers, surfactants, scale inhibitors, coated proppant activators, proppants, perforation ball sealers, anti-sludge agents, asphaltene modifiers, corrosion inhibitors, defoamers, demulsifiers, diverting agents, foaming agents, hydrogen sulfide scavengers, iron control agents, iron sequestering agents, neutralizing agents, salts, scale removers and inhibitors, solvents, mutual and miscible solvents, wax dispersants and solvents, cement and cement blends, cement slurries, density control materials, lost circulation materials, or any combination thereof. The treating material or materials may be applied singularly, in combination, and with or without an accompanying well servicing liquid.

Figure 5:
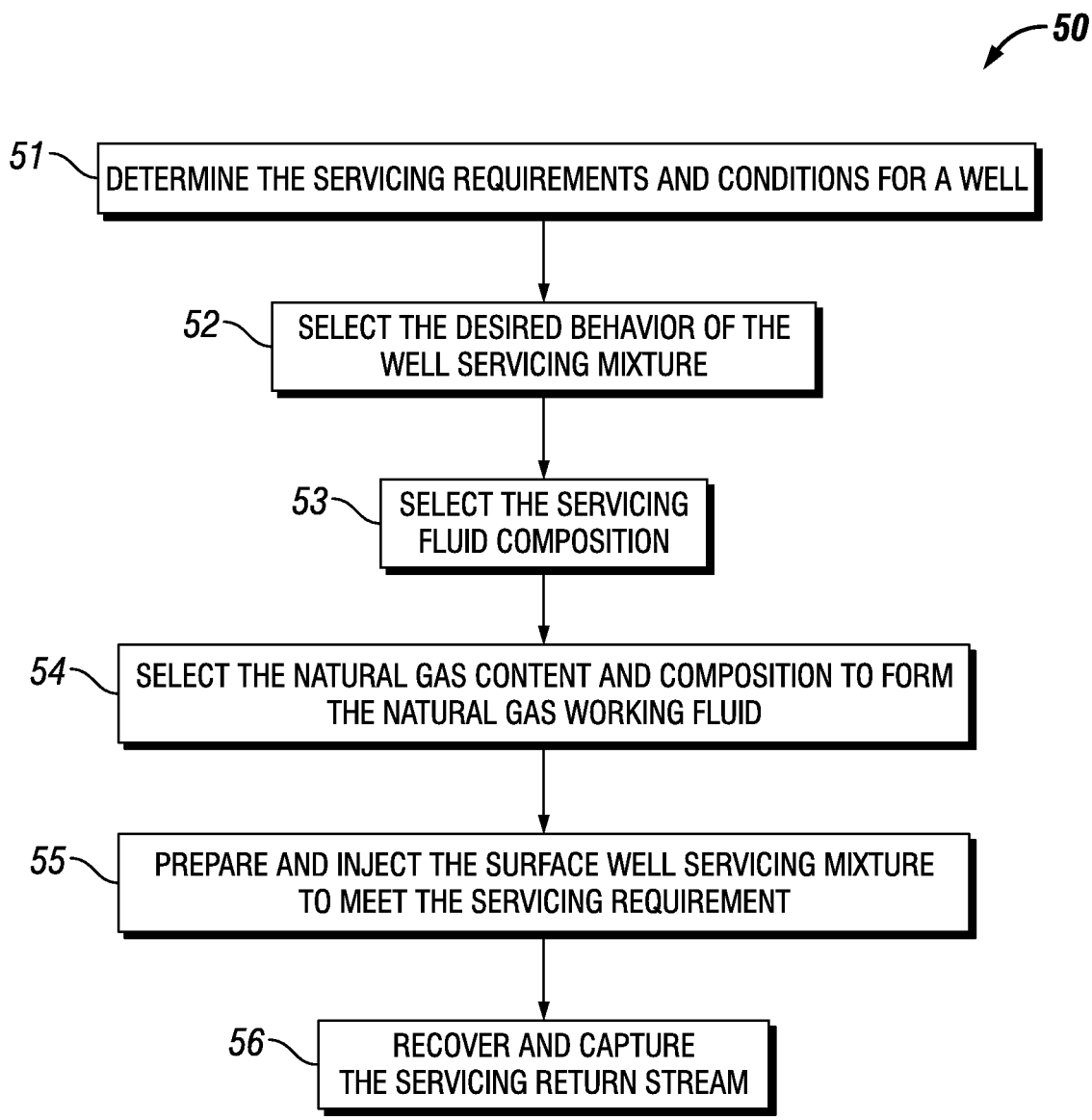
FIG. 5 is a flowchart depicting a method of application of natural gas to well intervention or servicing operations, according to one or more embodiments.

The embodiments described herein utilize well servicing equipment 1 as shown in FIG. 1 to carry out a well servicing method as depicted in FIG. 5.

More particularly, FIG. 1 illustrates one configuration of well servicing equipment for applying, recovering and capturing a natural gas and well servicing liquid stream in a closed system well servicing operation. The well servicing equipment 1 includes the preparing and pressurizing equipment 11 that can include servicing liquid tank 140 that contains the liquid servicing fluid; a well servicing utility unit 135 that contains and applies the treating material stored in one or more mounted treating material tanks 130 (two are shown in FIG. 1). The servicing liquid from servicing liquid tank 140 and treating material from treating material tank 130 may be combined within the well servicing utility unit 135 to form a prepared fluid then fed to a mounted service pump 150, again within the well servicing utility unit 135, where the well servicing fluid is pressured to well servicing injection pressure. The servicing liquid tank 140 is fluidly coupled to the treating material tank 30 by liquid conduit 131.

The well servicing equipment 1 also includes natural gas preparation equipment 10 that can include mobile storage vessel 110 that can store the natural gas in a liquefied state (e.g., LNG); a LNG servicing pumper 120 that pressurizes the LNG to well servicing conditions and then heats the LNG to a desired injection temperature. The mobile storage vessel 110 is fluidly coupled to the LNG servicing pumper by an LNG conduit 111.

The well servicing equipment 1 also includes a component 152 for alternately injecting or combining the prepared fluid (via conduit 151) and the gaseous natural gas stream (via conduit 121) to form the working fluid and directing this mixture to a wellhead 160. In this manner the working fluid comprising 5 vol % to 100 vol % natural gas is prepared and injected into the wellbore of a well (not shown) and optionally into a reservoir of the well (not shown) to undertake the servicing operation.

With continued reference to FIG. 1, a flow back system 12 is provided to process and capture a well servicing effluent stream received from the wellhead 160 via conduit 171. A four phase separator 170 coupled to the conduit 171 separates recovered gases from a recovery stream containing injected and native natural gas, solids and liquid streams. The recovered liquids are further separated within the separator 170 between aqueous and non-aqueous streams, including the well servicing liquid, resulting treating material liquids and produced native reservoir liquids, are directed to closed liquids recovery tanks 190 via a liquids conduit 191. Liquids recovery may or may not involve a tank; rather they can be directed to a liquids suitable pipeline (not shown) for processing should that facility exist. Recovered solids may be captured within the separator 170 and require periodic removal as they accumulate. The recovered gases from separator 170 including the applied natural gas and produced reservoir gases, are directed to a gas pipeline 180 via a gas conduit 181, where they are directed to a facility (not shown) for processing, sale or re-use. In this or a similar manner, an environmentally closed well servicing system can be produced and applied permitting well servicing operations to be completed without venting or flaring to a flare 199 via conduit 198.

The well servicing injection, circulation and flow back operations in accordance with at least one embodiment will now be described with reference to FIGS. 2A-2F, 3A, 3B, and 4.

Referring now to FIGS. 2A-2F, a number of different injection configurations can be used to form a working fluid 230 and inject the working fluid into a wellbore 250 of a well 200 during a matrix well servicing operation. In a first injection configuration as shown in FIG. 2A, the working fluid 230 comprises a 100% natural gas stream 210 supplied by the natural gas preparation equipment 10. In a second well injection configuration as shown in FIG. 2B, the working fluid 230 comprises a mixture of the natural gas and a well servicing fluid that are combined prior to the working fluid being injected into the wellbore 250; the well servicing fluid can comprise a well servicing liquid, or a treating material, or a combination of the well servicing liquid and the treating material. In a third well injection configuration as shown in FIG. 2C, the working fluid 230 is formed in the wellbore 250 from the concurrent injection of the natural gas stream 210 and the well servicing fluid 220 into the wellbore 250. In a fourth well injection configuration as shown in FIG. 2D, a tubular conduit 255 is provided within the wellbore 250; the tubular conduit 255 may be a temporary working conduit such as provided by coiled tubing. The natural gas stream 210 is injected into tubular conduit 255; concurrently, the well servicing fluid 220 are injected into the wellbore 250 outside of the tubular conduit 255 and mix with the natural gas at a discharge end of the tubular conduit 255 in the wellbore 250 to form the working fluid 230. In a fifth well injection configuration as shown in FIG. 2E, the natural gas stream 210 is injected into the wellbore 250 with well servicing fluids 220 in a sequential manner to minimize mixing within the wellbore 250 or reservoir 290. In a sixth well injection configuration and as shown in FIG. 2F, the tubular conduit 255 is inserted into the wellbore 250 and is hydraulically isolated at least at one point using one or more packers 258; the natural gas stream 210 and well servicing fluids 220 can then be sequentially injected through the tubular conduit 255 into the wellbore 250 (as shown in FIG. 2F); alternatively, a working fluid 230 comprising 100% natural gas or comprising a mixture of natural gas and well servicing fluid can be injected through the tubular conduit 255.

In each of the injection configurations shown in FIGS. 2A-2F, the working fluid 230 is injected into the wellbore 250 and in some cases also through perforations 260 in the well and into a reservoir 290 of the well 200. The working fluid 230 mixes with a recovery target material (not shown) contained within one or more of the wellbore 250, the perforations 260 and the reservoir 290 to form a heterogeneous phase well servicing mixture. In each of the well injection configurations shown in FIGS. 2A-2F, multiple conduits (not shown) can exist within the wellbore 250 that are configured for injection and multiple distinct reservoirs (not shown) or multiple points within a distinct reservoir can hydraulically communicate with the wellbore 250, e.g., a horizontal wellbore. Hydraulic communication between the wellbore 250 and the reservoir 290 may be provided by methods known within the industry including perforations, slots, liners, sliding sleeves and screens.

Figure 3A:
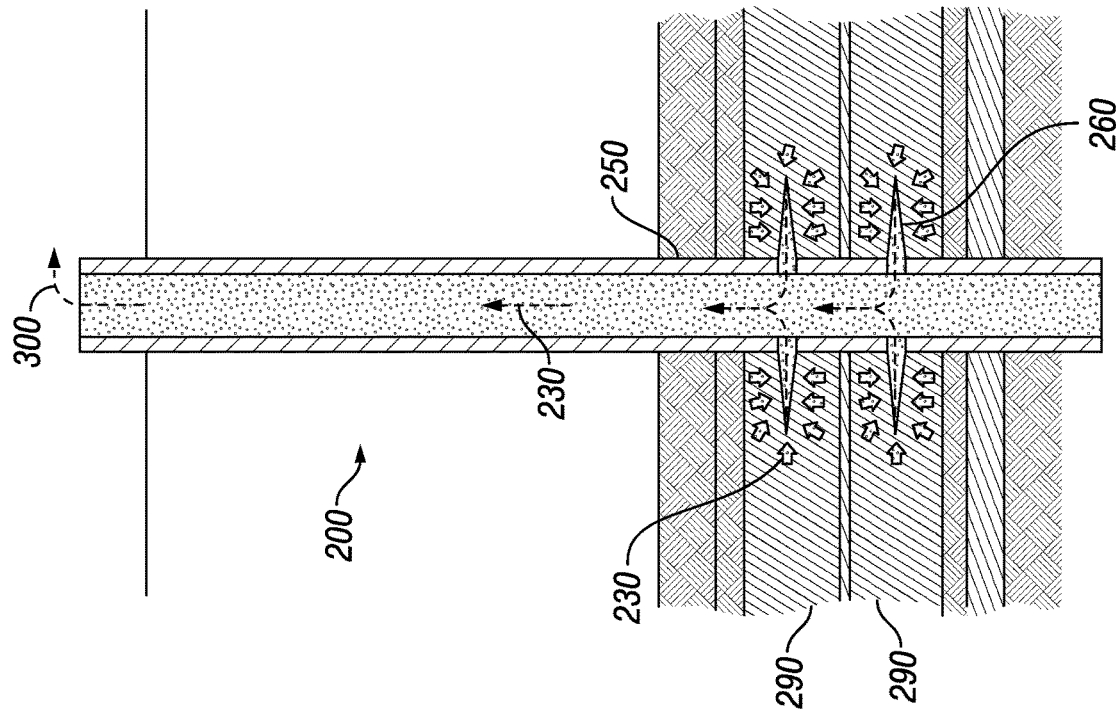
FIGS. 3A and 3B are schematics illustrating the injection and recovery sequences during a matrix well servicing operation, according to one or more embodiments.
Figure 3B:
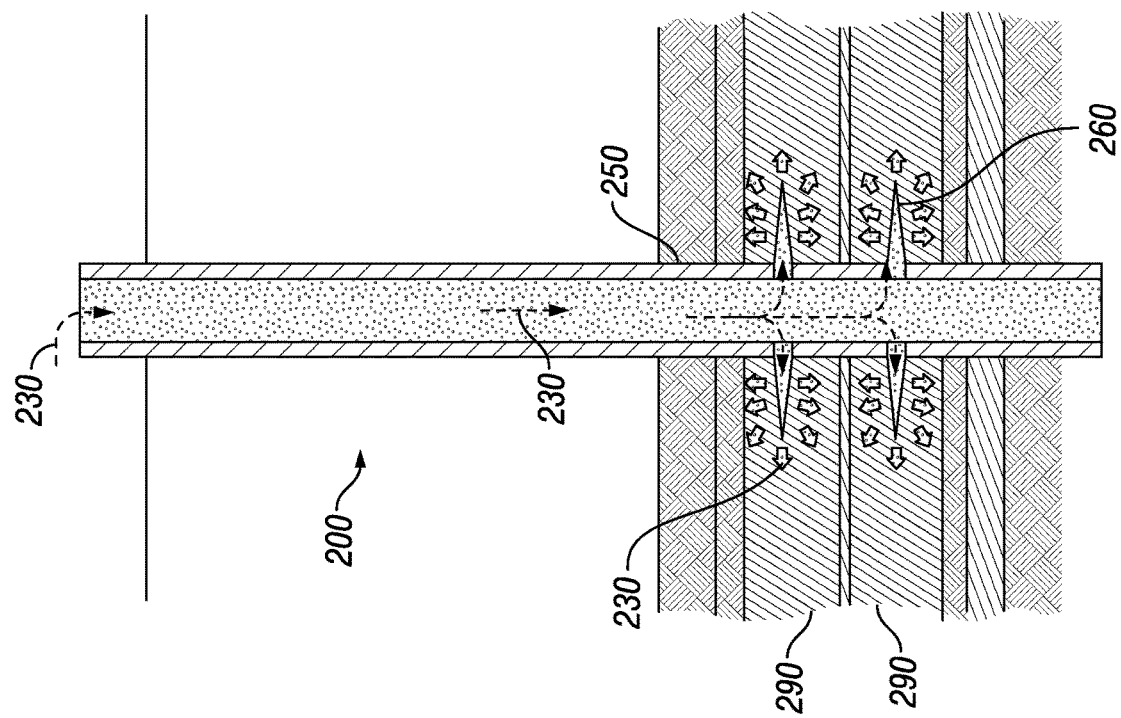

Referring now to FIGS. 3A and 3B, after the working fluid 230 has been injected into the wellbore 250 and/or reservoir 290 of the well 200, the heterogeneous phase well servicing mixture is recovered to surface. FIG. 3A illustrates a well servicing injection operation in the well 200 having the wellbore 250, perforations 260, and the reservoir 290. The working fluid 230 enters the wellbore 250 and flows through the perforations 260. From the perforations 260 the working fluid 230 moves through the permeations in the reservoir 290 and occupies the pores, fissures and/or fractures within the reservoir 290. Within the pores the injected working fluid 230 will at least displace and mix with native reservoir fluids and other contained materials and potentially contact the reservoir rock forming the matrix. Should one or more unwanted materials be present, such as perforating fines, rock fines, mobilized clays, waxes, emulsions, precipitates, the formation rock itself or contaminating gases, the natural gas working fluid 230 will displace, mix and contact the unwanted material as well. A selected treating material for the unwanted material can be included within the injected working fluid 230, and cause the unwanted material to react, dissolve, or in some manner dissociate and be entrained into the injected working fluid 230. Upon injecting sufficient working fluid 230 to contact the desired pores within the reservoir 306, injection is stopped and any treatment material in the working fluid 230 is left in place for a sufficient time to achieve a desired effect on the unwanted material, e.g., completion of chemical reaction, dissolution of solids, mixing of liquids, diffusion between phases, phase change, evaporation or condensation.

Treating materials can be selected to remain at least in part within the reservoir 290 or wellbore 250 following completion of the well servicing operation may be placed into the well 200 using the working fluid 230. The treating materials are selected to remain for a time within the reservoir 290, perforations 260 or wellbore 250 to complete a temporary or longer term beneficial purpose; such as wax crystal modifiers to reduce wax deposits, scale inhibitors to reduce scaling, reservoir plugging materials to reduce water production and perforation sealers for temporary reservoir isolation from the wellbore. In this manner the working fluid 230 may be applied to the well servicing operation to efficiently place natural gas alone or along with treating materials into the wellbore 250 or the reservoir 290 matrix or to cause removal unwanted materials from the wellbore 250 or the reservoir 290 matrix. Further, use of natural gas as a carrier or displacement fluid improves control of hydrostatic pressures during the injection operation to ensure injection rate control improving placement efficiency. Upon completing the injection phase of the well servicing operation, the well may be flowed to remove the components to be recovered from the well servicing operation.

Further, injection of the working fluid 230 may be completed into the matrix of a reservoir 290 for the purpose of pressuring the reservoir 290 to achieve a desired effect or as a means to assess the injection, flow capacity or in some way evaluate the reservoir. Desired effects achieved by pressuring the reservoir 290 may include improvements in subsequent flow back rates through the reservoir to better entrain unwanted materials, improvements in pressure sensitive properties of existing fluids or materials within the matrix, or alternations of rock stress profiles within the pores.

Referring now to FIG. 3B, the well servicing mixture 300 can be or include, but is not limited to, at least a portion of the natural gas in the working fluid 230 and one or more entrained materials or materials resulting from the servicing operation (e.g., the recovery target material) and native reservoir fluid. In order to begin production of native reservoir fluids, a sufficient amount of the recovery target material is removed from the underground reservoir 290 and the wellbore 250 by opening the well, and flowing a stream of the well servicing mixture 300 ("recovery stream 300") from the underground reservoir 306 through the reservoir matrix and up the wellbore 250 and to a flow back system (not shown).

If sufficient reservoir pressure exists to overcome the capillary and viscous flowing forces holding the fluids in place inside the reservoir 290 (collectively "reservoir resistive effects"), as well as the bottom hole flowing pressure, the recovery stream 300 may flow from the reservoir 290 up the wellbore 250, through any surface flow back equipment and into a processing facility or into a pipeline for flow to a remotely located processing facility (not shown). The bottom hole flowing pressure comprises frictional losses of the flow from the perforations to surface ("flowing friction pressure"), plus the hydrostatic pressure, plus any surface equipment pressure losses, and the capture system inlet pressure. If the reservoir pressure cannot overcome the existing reservoir resistive effects and bottom hole flowing pressure, a certain amount of natural gas can be added to the working fluid 230 to increase the wellhead flowing pressure such that the recovery stream 300 can overcome any surface flow back equipment pressure losses and still have a sufficient pressure at the capture system inlet to meet inlet pressure requirements for a pipeline or processing facility. More particularly, natural gas in the working fluid serves to reduce the liquid content placed into the reservoir 290 during the servicing operation, to expand upon opening the well 200 to maintain pressure to drive fluids from the reservoir matrix, and, by reduction of liquids in the returning flow stream, reduce the density and hence the hydrostatic pressure of the fluids flowing in the wellbore 250. The liquid content can be optionally reduced to a level which meets pipeline and processing facility compositional requirements, or at least to a level which can be captured by closed storage tanks, thereby avoiding the need to expose the liquids to the environment by depositing into open tanks.

Referring now to FIGS. 4A-4D, and according to another embodiment, a well servicing for circulation operations using a working fluid comprising natural gas. Each of the FIGS. 4A-4D shows a different circulation mode of the circulation operation. In each circulation mode, a tubular conduit 455 is inserted into a wellbore 450 of a well 400; the conduit 455 may be a temporary work string such as that provided by coiled tubing. The bore of the tubular conduit 455 defines one fluid flow path, and the annular space 456 defined between wellbore 450 and the tubular conduit 455 defines a second fluid flow path. During circulation operations, perforations 460 may not be in place, be physically isolated from the circulation flow, or be temporarily plugged to prevent inflow of the well servicing fluids to the reservoir.

As shown in FIG. 4A and according to a first circulation mode, natural gas 410, used as a working fluid, can be injected into the well 400 with flow within one flow path (injection flow), while fluids displaced from the well flow to surface within the other flow path (return flow) to form a circulation path; either flow path 455, 456 can serve as the injection or return flow. The circulating pressure at any point within the wellbore 450 is determined by the surface injection pressure and temperature, the hydrostatic and friction pressure along the circulation path, and finally the wellhead flowing pressure of the return flow stream. The natural gas 410 can be injected down conduit 455 and contacts the unwanted material 489 ("recovery target material") within the wellbore 450. The recovery target material 489 can be any of a liquid, solid or gas. By displacing or being forced through the recovery target material 489 from the circulation injection flow, the natural gas 410 will at least displace, mix or entrain the recovery target material 489, to form a returning well servicing mixture 490 to surface as recovery stream 491. By continued injection through conduit 455, the formed well servicing mixture 490 is circulated from the wellbore 450; transporting the recovery target material 489 up the wellbore 450 with the natural gas through the return conduit 456.

As shown in FIG. 4B and according to a second circulation mode, a natural gas well servicing fluid 430 containing natural gas and a treating material is injected into the well 400 through flow path 455 with the return well servicing mixture stream 490 returning to surface through flow path 456. The injection stream may serve to deposit treating materials ("delivery target material") into the wellbore 450, or alternately remove unwanted materials (not shown, "recovery target material") from the wellbore 450. Suitable treating materials include inhibitors for wellbore corrosion protection or methanol to prevent hydrate formation. Unwanted materials can include, but are not limited to, one or more hydrates, one or more fracturing proppants, one or more accumulated reservoir liquids, or any combination thereof.

As shown in FIG. 4C and according to a third circulation mode, the natural gas 410 and a well servicing fluid 420 can be injected sequentially into the wellbore 450 through flow path 455 to form the working fluid and the recovery stream 491 can be recovered via flow patch 456. Sequential injection may permit placement of a concentration of treating material or well servicing fluid 420 with no or little natural gas content such as to improve chemical attack on an unwanted material (not shown), at least to promote complete wetting of contacted materials or the wellbore 450, provide a slug of dense material for improved solids transport, or deploy a highly viscous sweep fluid to efficiently transport materials. Some mixing of natural gas 410 with well servicing fluid 420 may occur at the gas-liquid interface, due to reasons such as a density driven liquid bypass in downward flow and liquid fall back in upward flow. Similarly, gas phase bypass in horizontal flow may be expected. However, interface mixing can be controlled to at least a certain extent with selected fluid properties and injection rates. Beneficially, alternating injection of the well servicing fluid 420 with working fluid containing natural gas 410 permits control of hydrostatics within the injection flow path 455 and return flow path 456 to manage pressure within the wellbore 450, for example at the perforations. In this manner a desired free gas phase heterogeneous working fluid is formed within the wellbore 450. When deployed in this manner, the returning well servicing fluid 492 may contain and serve to transport the greater portion of the unwanted materials to remove from the wellbore as displaced by the sequentially injected natural gas stream 491. Alternatively, the return well servicing fluid stream 492 or components thereof may mostly remain within the well as a placed material, or commingle with, or evaporate into, the returning natural gas stream 491.

As shown in FIG. 4D and according to a fourth circulation mode, a fluid containing natural gas 440 (e.g., a working fluid and/or a well servicing fluid) can be injected into the well 400 through injection flow path 455 with the return flow stream 490 flowing via return flow path 456. In this operation, the well servicing operation is conducted such that during the circulation operation the reservoir produces fluids 485. The produced reservoir fluids 485 are commingled with the well circulation return stream 490 which may also contain unwanted wellbore materials. Further, the produced reservoir fluids 485 may contain unwanted materials or servicing fluids from a previous servicing operation with the servicing operation completed to draw those unwanted materials from the reservoir.

As illustrated for the well servicing injection operation, injection of natural gas 410, the well servicing fluid 420, and/or the fluid containing natural gas 440 to form a working fluid for circulation operations as illustrated in FIGS. 4A-4D can be completed in any number of wellbore configurations and with the natural gas working fluid formed at surface prior to entering the well or within the well where the components are injected at surface to form a heterogeneous phase well servicing mixture within the wellbore 450. Further, a multiple of conduits can exist within the wellbore configured for circulation and a multiple of distinct reservoirs or multiple points within a distinct reservoir may hydraulically communicate with the wellbore 450; such as in a horizontal wellbore. Hydraulic communication between the wellbore 450 and the reservoir may include those methods known within the industry including perforations, slots, liners, sliding sleeves and screens.

FIG. 5 is a flowchart depicting a method 50 that includes applying or otherwise using natural gas in well intervention or servicing operations, according to one or more embodiments.

At 51, the target material for the servicing operation and servicing conditions are determined: the material to be placed or removed within the wellbore or underground formation is identified ("delivery target material" and "recovery target material" respectively); and the pressure and temperature conditions at the point or points of the servicing operation within the well ("the servicing conditions") can be determined in accordance with one or more of the following servicing constraints: reservoir pressure and temperature, reservoir fracturing pressure, minimum surface recovery pressure, and/or wellbore geometry.

At 52, the desired behavior of the well servicing mixture can be selected: properties of the well servicing mixture are determined to achieve selected behavior(s) during the servicing operation, which include volume of free gas, mixture density, mixture volume, or dissolved gas; and the determined properties required to achieve these selected behaviors. The determined properties can be or include, but are not limited to, properties of the working fluid to alter the behavior and transport of the target material; composition of the working fluid to alter the behavior of the target material; servicing injection pressure and temperature; properties of the well servicing mixture; composition of the recovery stream; and recovery stream pressure and temperature.

At 53, the composition of the well servicing fluid is selected to achieve the selected behavior.

At 54, the natural gas composition and content of the working fluid is selected.

At 55, the selected working fluid is prepared and injected into the well: the working fluid is injected at the selected natural gas composition and quantity and with the selected well servicing fluid; and the injection is completed at the selected servicing pressure and temperature such that the well servicing mixture stream has the selected behavior(s) during the servicing injection steps of the servicing operation.

At 56, the well servicing mixture is recovered and captured ("recovery stream"): the recovery is completed at the selected recovery pressure and temperature such that the well servicing mixture has the selected behavior(s) during the recovery steps of the servicing operation. At surface and under the recovery conditions, the recovery stream is separated into two or more phase streams, namely: gas phase, hydrocarbon liquids phase, aqueous phase and solid phase. The gas phase can be or include injected and reservoir natural gas; however, this phase may also contain reaction product gases. The injected natural gas quantity within the natural gas working fluid may be selected to ensure the recovered gas stream content is suitable to meet the pipeline or facility inlet composition specification. The hydrocarbon fluid phase is expected to contain mostly hydrocarbon and applied hydrocarbon soluble materials, including: hydrocarbon based servicing liquids, treating material, well material, reaction products and reservoir materials. Similarly, the aqueous phase will contain all of the applied aqueous and aqueous soluble materials resulting from the well servicing operation. The recovered solid phase can include those solids undissolved or chemically consumed, or those solids generated or entrained during the well servicing operation.

As will be discussed below, there are at least three different embodiments of the method of applying a working fluid comprising natural gas to complete well servicing operations, wherein the well servicing mixture at the application conditions and recovery stages of the well servicing operation include a free gas phase. A first embodiment involves selecting the composition of the working fluid to comprise natural gas and a delivery target material such that the injected working fluid places the delivery target material at a location within the well (wellbore or reservoir) during the well servicing operation and contains a free gas phase during the servicing and recovery steps of the servicing operation. A second embodiment involves selecting the composition of the working fluid to comprise natural gas and other components such that the injected working fluid mixes with at least one recovery target material in the well (wellbore or reservoir) to form a well servicing mixture and the recovery target material is removed during the well servicing operation, and the well servicing mixture contains a free gas phase during the servicing and recovery steps of the operation. A third embodiment involves selecting the composition of the working fluid to comprise 100% natural gas such that the injected working fluid mixes with at least one recovery target material in the well to form a well servicing mixture and the recovery target material is removed during the well servicing operation, and the well servicing mixture contains a free gas phase during the servicing and recovery steps of the operation.

A further fourth embodiment relates to well servicing operations using a natural gas and a well servicing liquid wherein the well servicing fluid and the natural gas are injected into the wellbore sequentially and phase mixing between the injected fluids is minimized in order to better maintain the individual behaviors or properties of the injected well servicing fluids and natural gas working fluid.

In an additional fifth embodiment, flow from the reservoir is maintained during at least a part of a circulation servicing operation such that the reservoir flow contributes to the return stream to cause removal of unwanted materials from the reservoir or to enhance removal from the wellbore of the well servicing fluid stream.

In order to achieve the desired free gas phase and other behaviors of the well servicing mixture during the injection and recovery steps of the servicing operation, the operator should know the relationship between the desired behavior and the dissolved quantity of natural gas in the mixture at the servicing and recovery conditions; for example, when control of the free gas phase of the mixture during the servicing operation is desired, the operator should know the dissolved gas volume in order to produce the desired free gas phase. Unique dissolved gas content exists for each possible composition of the well servicing mixture at the servicing conditions and for the composition at surface recovery conditions. The free gas volume of the well servicing mixture can thus be determined by selecting the quantity of natural gas within the natural gas working fluid. Table 1 displays the solubility of methane in water over a range of temperatures and pressures where the solubility is seen to be minimal even through to elevated pressures at moderate temperatures. Notably, natural gas solubility in aqueous solutions can only be slightly altered with the addition of ionic solutes or selected organic liquids. In aqueous solutions, the solubility of other common hydrocarbon gases contained in natural gas, such as $C_2$-$C_5$, are similar to that of methane such that natural gas solubility in is mostly independent of natural gas composition. Based upon the determined servicing pressure and temperature, the minimum gas content to achieve a free gas phase volume with the specific well servicing fluid can be determined, for example. In the case of a circulation operation with a determined servicing pressure and temperature and determined properties of the natural gas working fluid, the injection temperature and pressure and the related recovery flowing temperature and pressure can be applied to ensure a suitable free gas phase to achieve the desired circulation pressure.

TABLE 1

Solubility of Methane in Water at Temperature and Pressure
Solubility of Methane in Water (sm3/m3)

| Pressure | Temperature (C.) | | | | |
|---|---|---|---|---|---|
| (kPa) | 0 | 30 | 60 | 90 | 120 |
| 100 | 0.1 | 0.0 | 0.0 | 0.0 | 0.0 |
| 5,000 | 2.3 | 1.3 | 1.0 | 0.9 | 0.9 |
| 10,000 | 3.8 | 2.2 | 1.7 | 1.6 | 1.8 |
| 15,000 | 4.9 | 3.0 | 2.3 | 2.3 | 2.5 |
| 20,000 | 5.6 | 3.5 | 2.8 | 2.8 | 3.1 |
| 30,000 | 6.8 | 4.4 | 3.6 | 3.6 | 4.1 |
| 40,000 | 7.8 | 5.0 | 4.2 | 4.3 | 4.9 |
| 50,000 | 8.6 | 5.6 | 4.8 | 4.9 | 5.6 |
| 60,000 | 9.5 | 6.2 | 5.2 | 5.4 | 6.2 |
| 70,000 | 10.3 | 6.7 | 5.7 | 5.8 | 6.8 |
| 80,000 | 11.1 | 7.2 | 6.1 | 6.2 | 7.2 |
| 90,000 | 11.9 | 7.7 | 6.5 | 6.6 | 7.7 |
| 100,000 | 12.6 | 8.1 | 6.8 | 7.0 | 8.1 |
| 110,000 | 13.4 | 8.6 | 7.2 | 7.3 | 84 |
| 120,000 | 14.1 | 9.0 | 7.5 | 7.6 | 8.8 |

Source, Zhenhao Duan et al, The prediction of methane solubility in natural waters to high ionic strength from 0 to 250° C. and from 0 to 1600 bar, Geochimica et Cosmochimica Acta, Volume 56, Issue 4, April 1992, Pages 1451-1460

If, at the initially selected natural gas content of the working fluid, circulation conditions at the servicing point within the well result in an large dissolved natural gas content, the well servicing mixture will provide an insufficient free gas phase volume to achieve the desired properties. With an increased gas content added to the working fluid mixture, the free gas phase will increase to, for example, reduce the mixture density and thereby at least reduce the circulation pressure. In this manner the selected natural gas content to achieve a desired circulation condition for a well servicing fluid can be selected, if such result is desired.

In a preferred application, the working fluid is applied with and to materials where natural gas exhibits inherently low solubility into liquids, or sorption into solids, within the servicing application to allow a free gas phase to readily remain within the resulting well servicing mixture. With minimal dissolved gas over a range of conditions, the mixture properties will be much more consistent and the application much easier to control toward meet the servicing requirements. Specifically, the working fluid is applied with or to materials wherein nominal natural gas contents readily exceed the solubility or absorption capacity and the excess of natural gas thereby provides a consistent and predictable gas phase quantity and behavior to produce and maintain at least a two phase fluid across a wide range of application conditions. Additionally with limited dissolved natural gas within the servicing application temperature and pressure range, the behaviors of the accompanying servicing liquid or solid are minimally altered; such as but not limited to viscosity, density, surface tension and crystal structure and ductility. Within most aqueous based fluids the natural gas solubility is less than 50 $sm^3/m^3$ over the full range of anticipated servicing conditions. At these minimal interactions, the natural gas does not noticeably alter the properties or behavior of the aqueous phase nor does the presence of an aqueous phase noticeably alter the properties or behavior of the gas phase.

In applications applying organic or hydrocarbon liquids at certain natural gas compositions and application conditions, natural gas solubility is or can be managed to maintain minimal solubility over a range of servicing conditions. For example, the solubility of natural gas in alcohols is limited at lower pressures; methanol for example exhibits a solubility of about 60 $sm^3$ natural gas for each $m^3$ of methanol at 90° C. and 16 MPa. As a further example, Table 2 displays solubility's of methane within typical oils over range of common oil densities and at a temperature of 90° C. The solubility is seen to be minimal for heavier, lower API density hydrocarbons at lower pressures. For example, the 25° API oil at pressures below 15,000 kPa exhibit comparatively low solubility of less than 37.3 $sm^3$ natural gas for each $m^3$ of liquid hydrocarbon. Preferentially, heavier hydrocarbons are selected to minimize dissolved natural gas variations with pressure and temperature changes. In this application, liquids are selected wherein the natural gas solubility at the servicing conditions is typically less than 100 $sm^3/m^3$ (standard volumes of gas dissolved in a unit volume of material).

Within hydrocarbon liquids and unlike aqueous solutions, composition of the natural gas may significantly affect solubility. As above, the 25° API oil with dry natural gas, an S.G. of 0.55 and containing very little or no ethane, propane, butane, at 15,000 kPa dissolves just over 35 $sm^3/m^3$ natural gas. This same 25° API oil when commingled with a richer natural gas, at a 0.70 S.G. with increased content of ethane, propane, butane results in an increased solubility to nearly 50 $sm^3/m^3$. In this manner, the composition of the natural gas can be selected to control the solubility within a selected hydrocarbon.

TABLE 2

Solubility of Methane in Liquid Hydrocarbons
at a Temperature and Various Pressures
Solubility of Methane in Hydrocarbon Liquids
T= 90 SG = 0.55
Hydrocarbon API Gravity

| Pressure (kPa) | 25 | 35 | 45 | 55 | 65 |
|---|---|---|---|---|---|
| 500 | 0.9 | 0.8 | 1.1 | 1.5 | 2.1 |
| 1,000 | 1.9 | 1.9 | 2.6 | 3.5 | 4.8 |
| 2,000 | 4.1 | 4.4 | 5.9 | 8.0 | 10.8 |
| 5,000 | 11.2 | 12.9 | 17.6 | 23.8 | 32.1 |
| 10,000 | 23.9 | 29.5 | 40.1 | 54.2 | 73.1 |
| 15,000 | 37.3 | 47.7 | 64.9 | 87.7 | 118 |
| 20,000 | 51.1 | 67.1 | 91.3 | 123 | 166 |
| 25,000 | 65.2 | 87.5 | 119 | 161 | 217 |
| 30,000 | 79.6 | 109 | 148 | 200 | 269 |
| 40,000 | 109 | 153 | 208 | 281 | 379 |
| 50,000 | 139 | 199 | 271 | 366 | 494 |
| 60,000 | 170 | 247 | 337 | 454 | 613 |
| 70,000 | 201 | 297 | 404 | 546 | 736 |
| 80,000 | 233 | 348 | 474 | 639 | 863 |
| 90,000 | 265 | 400 | 545 | 735 | 992 |

For application of mixtures where natural gas is applied to produce the free gas phase well servicing mixture, the preferred liquid composition, with the natural gas composition and content, is selected to produce a well servicing mixture where the natural gas does not affect the liquid phase properties. This is accomplished by maintaining a minimal dissolved natural gas content. Further, sufficient natural gas is added to the well servicing mixture that at least a portion of the added natural gas remains in the gas phase to produce a two phase gas-liquid well servicing mixture at the servicing and recovery conditions. Further, natural gas is applied to produce the free gas phase well servicing mixture, the preferred liquid composition, with the natural gas composition and content, is selected to minimize vaporization of the liquid phase into the free gas phase to ensure the composition, properties and quantity of the liquid and the free gas phase are at most minimally altered.

Within the applied free gas phase, the natural gas and accompanying liquid mixtures are commingled or combined to exhibit two-phase flow regimes such as mist, bubble or slug type flow depending upon the mixing conditions, flow rate, hydraulic diameter and gas to liquid ratio.

Figure 6:
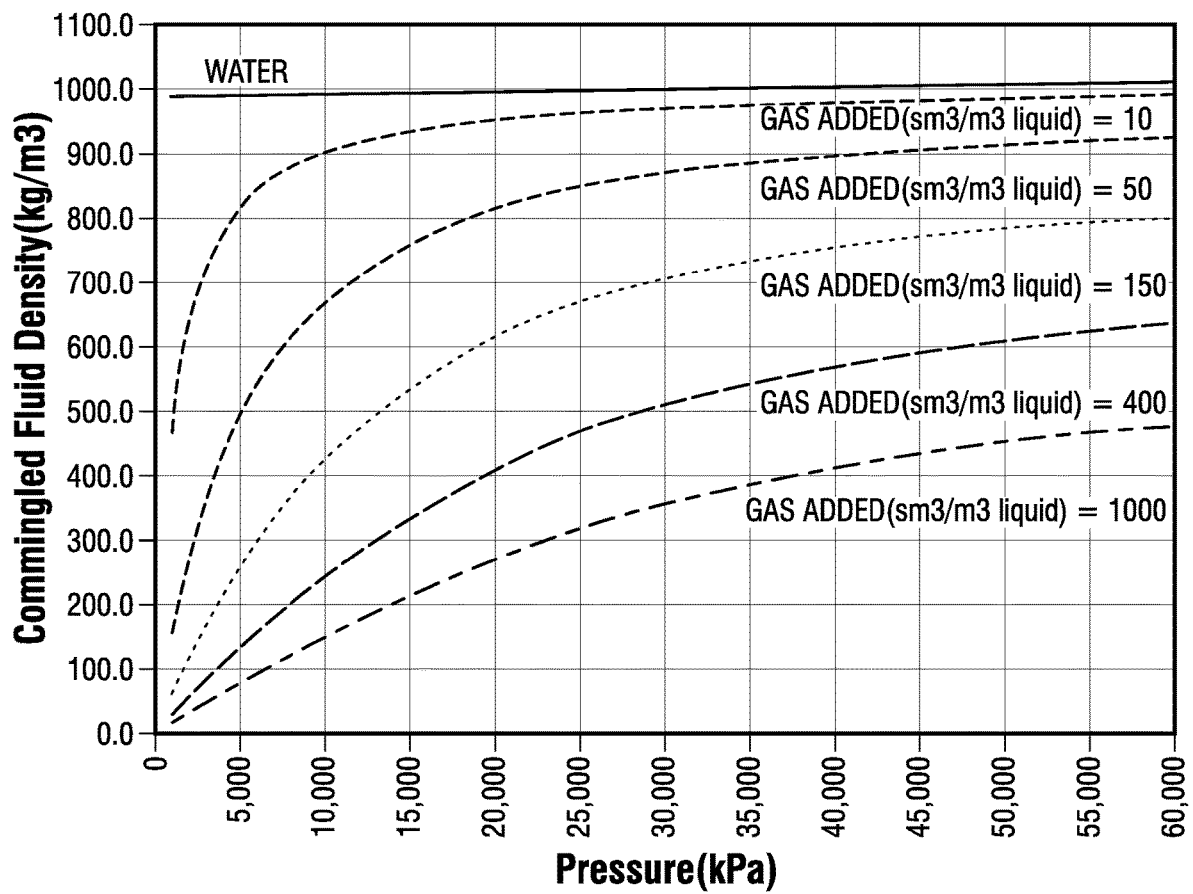
FIG. 6 illustrates the density resulting from commingling various quantities of natural gas with water at 60° C. and over a range of pressures, according to one or more embodiments.
Figure 7:
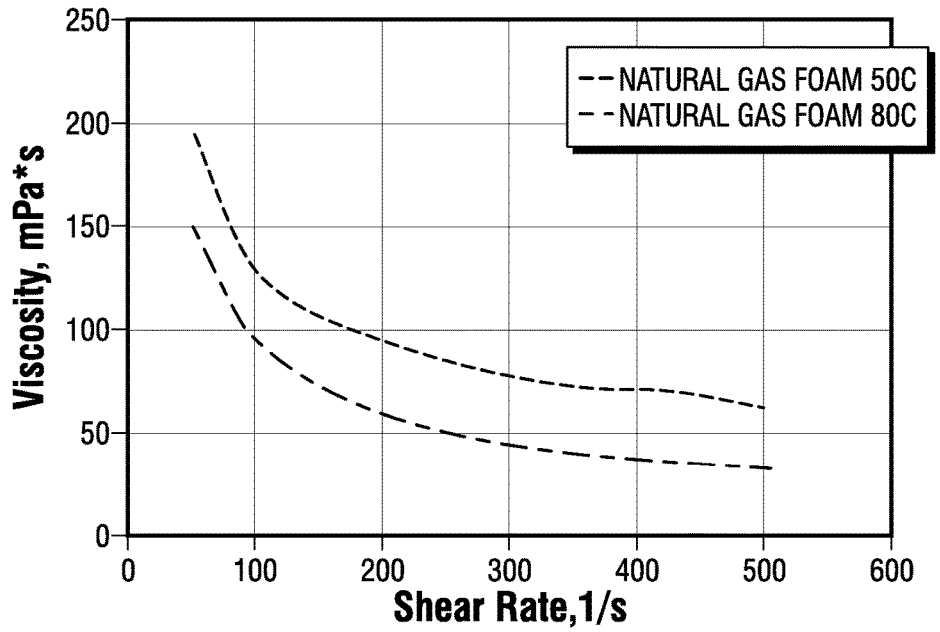
FIG. 7 illustrates laboratory rheology measurements completed on water based natural gas foams at 75 Quality, according to one or more embodiments.
Figure 8:
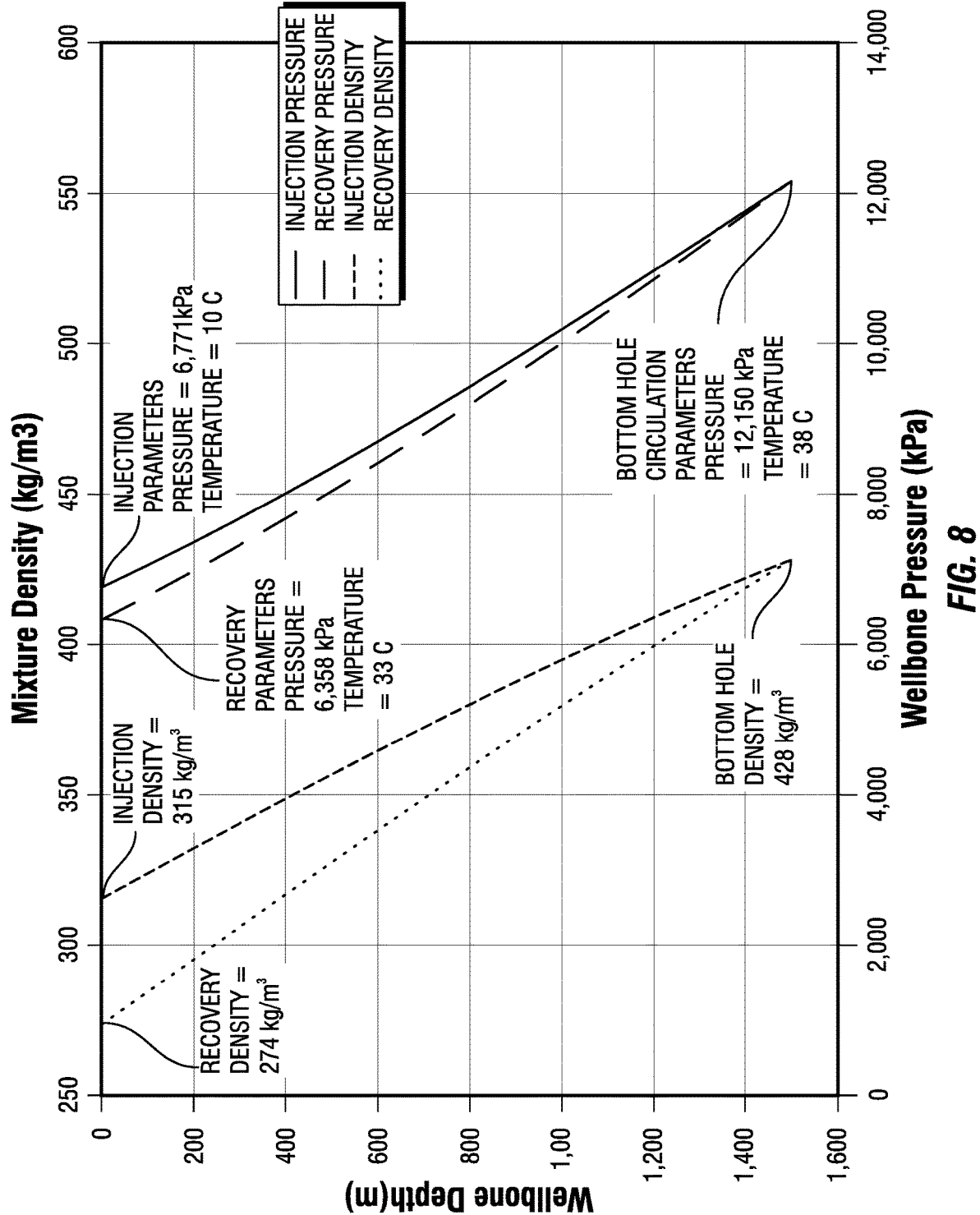
FIG. 8 presents simulation results for circulating pressure and density for a well servicing operation using natural gas, according to one or more embodiments.

Commingling natural gas with aqueous fluids allows control of the resulting mixture density. Determining the natural gas content to achieve the defined servicing conditions per step 63 will now be discussed in more detail with reference to FIGS. 6-8 and Tables 1-5. FIG. 6 illustrates a reduction in commingled fluid density that can be achieved by adding natural gas to water, e.g., when a well servicing mixture comprises natural gas and an aqueous fluid. Commingled fluid density determines the hydrostatic pressure exerted at the underground reservoir by fluids contained within a wellbore. In FIG. 6, a range of pressures from 1,000 kPa to 60,000 kPa at a temperature of 60° C. is presented as an illustration of density at selected natural gas and water ratios. Notably, the solubility of natural gas in water, as illustrated in Table 1 previously is minimal at less than 10 $sm^3/m^3$ over the full range of pressures at about 60° C. The natural gas to water ratios range from no added gas to gas added at a ratio of about 1,000 $sm^3$ of natural gas for each $m^3$ of water. Similar density reductions at other pressures, temperatures, gas ratios and aqueous based liquids can be achieved.

As shown in FIG. 6, water has a relatively consistent density of about 1,000 $kg/m^3$ at temperature and pressure such that a hydrostatic gradient of about 9.8 kPa/m is exhibited. For a well having a depth of about 2,000 m, this results in a hydrostatic pressure of about 19,600 kPa at the base of the wellbore. In the case of a circulation operation to place a treating material into the wellbore, should at least the hydrostatic exceed the reservoir feed pressure, the treating material may feed into the reservoir rather than be placed within the wellbore as desired. In contrast, with a natural gas ratio of 400 $sm^3/m^3$ liquid, the mixture density can vary from about 60 $kg/m^3$ at about 1,000 kPa to about 30 $kg/m^3$ at about 60,000 kPa resulting in a density reduction of about 40% to about 95% with a corresponding reduction in hydrostatic pressure exhibited by the fluid column on the underground reservoir. As a result, the bottom hole circulating pressure is reduced and the reservoir feed pressure not exceed with the treating material remaining in the wellbore.

In the case of matrix injection into the reservoir and pertaining to recovery of the injected servicing fluid, should the reservoir flowing pressure be insufficient to overcome the wellbore hydrostatic pressure, then the reservoir will not readily flow into the wellbore to permit efficient recovery of the treatment. If the hydrostatic pressure nearly matches the reservoir pressure, the pressure differential available to overcome reservoir resistive forces, i.e., viscous flowing forces, capillary pressures and relative permeability effects, is minimal and servicing fluid removal from the reservoir matrix is compromised. Again, with a natural gas ratio of about 400 $sm^3/m^3$ liquid the corresponding reduction in hydrostatic pressure exhibited by the fluid column on the underground reservoir will result in a reduced hydrostatic pressure, better drawdown to the reservoir to permit efficient recovery of the treatment. In addition to density reductions, addition of natural gas will increase the gross volume of a mixture to facilitate efficient dispersion of a small volume of treating material.

Table 2 illustrates the mixture volume achieved from adding natural gas to water at a ratio of about 400 $sm^3$ natural gas to each $m^3$ water. Similar volume increases at other pressures, temperatures, gas ratios and aqueous based liquids can be achieved. For example, in placing a treating material into a reservoir, efficient dispersion of a small volume of treating material can be difficult. Should, for example, a matrix pore space contact equivalent to 10 $m^3$ be desired around a wellbore in the reservoir at about 60° C. and about 20 MPa, then 10 $m^3$ of the treating material must be applied. In contrast, with a natural gas ratio of 400 $sm^3/m^3$ liquid, each single volume of treating material will produce 3.1 mixture volumes as per Table 3, whereby only 3.2 $m^3$ of treating material is required to achieve a 10 $m^3$ contact volume. As a result, the applied treating material volume is reduced to benefit the servicing operation's economics, to reduce the volume requiring recovery plus injected and recovered treating material handling, disposal and potential environmental impact.

TABLE 3

Mixture Volume Increase with Natural Gas in Water at a Gas Ratio of 400 $sm^3/m^3$ at Various Pressures and Temperatures

| Pressure | Temperature (C.) | | | | |
|---|---|---|---|---|---|
| (kPa) | 0 | 30 | 60 | 90 | 120 |
| 100 | 383.8 | 426.2 | 468.5 | 510.8 | 553.0 |
| 5,000 | 7.8 | 8.9 | 9.9 | 10.9 | 11.8 |
| 10,000 | 4.0 | 4.7 | 5.3 | 5.8 | 6.3 |
| 15,000 | 2.9 | 3.4 | 3.8 | 4.2 | 4.5 |
| 20,000 | 2.5 | 2.8 | 3.1 | 3.4 | 3.7 |
| 30,000 | 2.1 | 2.3 | 2.5 | 2.7 | 2.9 |
| 40,000 | 2.0 | 2.1 | 2.2 | 2.4 | 2.5 |
| 50,000 | 1.9 | 2.0 | 2.1 | 2.2 | 2.3 |
| 60,000 | 1.9 | 1.9 | 2.0 | 2.1 | 2.2 |
| 70,000 | 1.8 | 1.9 | 2.0 | 2.0 | 2.1 |
| 80,000 | 1.8 | 1.9 | 1.9 | 2.0 | 2.0 |
| 90,000 | 1.8 | 1.8 | 1.9 | 1.9 | 2.0 |
| 100,000 | 1.8 | 1.8 | 1.8 | 1.9 | 1.9 |
| 110,000 | 1.7 | 1.8 | 1.8 | 1.9 | 1.9 |
| 120,000 | 1.7 | 1.8 | 1.8 | 1.8 | 1.9 |

Ratio = 400 SM3/M3 Water

In water based applications, an external aqueous liquid phase to internal natural gas phase foam may be produced with foaming surfactants at gas content in the range of 50% to 95% by volume. The laboratory viscosity measurements of two such foam mixtures are presented in FIG. 7; natural gas and water are combined at 50° C. and 30 MPa and 80° C. and 50 MPa to a 75 quality natural gas working fluid. These natural gas and water mixtures were produced with common oilfield foaming surfactants and water gelling chemicals and are shown to combine to form highly viscous mixtures. The resulting foam viscosity is beneficial within well servicing for operations such as transporting solids or minimizing liquid fallback while displacing fluids from a wellbore. Further, the resulting mixture properties are markedly different from the base water itself. Notably the mixture density is significantly reduced below that of water at about 1,000 $kg/m^3$ to potentially of 150 $kg/m^3$; creating a large volume, very low density fluid with excellent transport properties and containing minimal water.

Table 3 illustrates the primary makeup of four example foamed water mixtures. Fluid #1 and Fluid #2 illustrate the water and natural gas content of the above laboratory tested mixtures at a 75 Quality. Fluid #3 shows the properties of 95 Quality foam at the same pressure and temperature as Fluid #2. Fluid #4 shows the properties of 95 Quality foam at 15 MPa and 20° C. to illustrate the variation in properties with changing application conditions. The described foam mixtures at qualities of 75-95 are presented at a selection of pressures and temperatures. Natural gas is added to the water to produce the desired quality where the content of natural gas added is adjusted for the application temperature, pressure and target quality. In the example set, natural gas can be added at about 835 sm$^3$ to about 6,500 sm$^3$ of natural gas for each m$^3$ of water to achieve the desired foam quality at the application pressure and temperature. At a given application condition the resulting foam mixtures exhibit density's that can be configured based upon the included content of natural gas, here shown to vary from about 165 kg/m$^3$ to about 420 kg/m$^3$, or greater. As is seen in Table 4, the foam density varies with foam quality and application conditions and can be selected by choosing the appropriate quality via added gas ratio at the servicing conditions. Additionally, the mixture volume resulting from a unit volume of water can be varied to meet a larger volume application requirement; a 75 quality foam produces 4 foam volumes for each volume of water while a 95 quality foam produces 20 foam volumes for each volume of water. Further, as is well known to those skilled in the art, selecting the quality of a foam will result in variations of the foam viscosity where higher foam qualities tend to produce higher viscosity mixtures.

TABLE 4

Example Foam Constituents and Properties

| Property | Units | Fluid #1 | Fluid #2 | Fluid #3 | Fluid #4 |
|---|---|---|---|---|---|
| Foam Quality | | 75 | 75 | 95 | 95 |
| Water Volume | m$^3$ | 0.25 | 0.25 | 0.05 | 0.05 |
| Gas Volume | m$^3$ | 0.8 | 0.8 | 1.0 | 1.0 |
| Temperature | ° C. | 50 | 80 | 80 | 20 |
| Pressure | MPa | 30 | 50 | 50 | 15 |
| Gas Volume Factor | sm$^3$/m$^3$ space | 278.3 | 340.5 | 340.5 | 180.5 |
| Gas Density | kg/m$^3$ | 189.2 | 231.5 | 231.5 | 122.7 |
| Water Density | kg/m$^3$ | 1000.7 | 992.9 | 992.9 | 1004.9 |
| Foam Density | kg/m$^3$ | 392.1 | 421.8 | 269.5 | 166.8 |
| Gas Added per m$^3$ Water | sm$^3$ | 835.0 | 1021.4 | 6468.9 | 3430.0 |
| Volume Ratio (foam to water) | — | 4 | 4 | 20 | 20 |

Commingling natural gas with non-aqueous fluids also allows control of the resulting mixture density given moderate solubility. Referring to Table 5, the properties of a typical 25° API oil saturated with natural gas at 90° C. over a range of pressures is presented; dissolved gas, saturated volume, saturated density and saturated viscosity.

TABLE 5

Properties of a Natural Gas Saturated 25° API Oil

| Pressure Gas (kPa) | Dissolved @ Sat'n (sm$^3$/m$^3$ oil) | Sat'd Liquid Volume (m$^3$/m$^3$ oil) | Liquid Phase Density (kg/m$^3$) | Liquid Viscosity (cP) |
|---|---|---|---|---|
| 500 | 0.9 | 1.12 | 805 | 4.2 |
| 1,000 | 0.9 | 1.13 | 805 | 4.0 |
| 2,000 | 4.1 | 1.13 | 803 | 3.7 |
| 3,000 | 6.4 | 1.13 | 801 | 3.4 |
| 4,000 | 8.8 | 1.14 | 799 | 3.1 |
| 5,000 | 11.2 | 1.14 | 798 | 2.9 |
| 6,000 | 13.7 | 1.15 | 796 | 2.7 |
| 7,000 | 16.2 | 1.15 | 794 | 2.5 |
| 8,000 | 18.7 | 1.16 | 792 | 2.4 |
| 9,000 | 21.3 | 1.16 | 790 | 2.3 |
| 10,000 | 23.9 | 1.17 | 788 | 2.1 |
| 12,000 | 29.2 | 1.18 | 784 | 1.9 |
| 14,000 | 34.6 | 1.19 | 781 | 1.8 |
| 15,010 | 37.3 | 1.19 | 779 | 1.7 |
| 16,000 | 37.3 | 1.19 | 780 | 1.7 |

Gas Gravity = 0.55
Hydrocarbon Density = 904 kg/m3
Temperature= 90° C.
Gas Added = 400 sm3/m3

As illustrated in Table 5 for the 25° API oil, the dissolved gas ratio is less than 37.3 sm$^3$/m$^3$ oil at pressures to 15 MPa. Results of oil swelling due to dissolved gas in combination with thermal expansion are shown as the Sat'd Liquid Volume. At low pressures a total expansion of about 12% is exhibited with saturated oil while the expansion at 15 MPa is just under 20%. The liquid phase density shows a reduction from the 904 kg/m$^3$ oil at ambient conditions to just over 800 kg/m$^3$ with dissolved gas and thermal expansion effects. Notably, dissolving gas to saturation at 15 MPa does reduce the liquid phase density; however, the density reduction with increasing dissolved gas is minimized by compression at increasing pressures. An overall and minimal liquid phase density reduction of about 3% results from minimal dissolved gas at 0.9 sm$^3$ and 500 kPa to 37.3 sm$^3$ at the 15,010 kPa saturation pressure. Of note is the liquid viscosity reduction with increasing dissolved gas where an initial viscosity of 4 cP at 90° C. at minimal dissolved gas is reduced by more than half at saturation conditions of 15 MPa. In this instance, should viscosity of the liquid phase be important to the servicing operation application, a liquid phase with less dissolved gas viscosity dependency may be selected or alternatively viscosity increasing chemicals can be added to overcome the loss.

Table 6 extends the behavior of the saturated 25° API oil to illustrate the properties resulting from addition of natural gas beyond the saturation content. In this example, natural gas is added at a ratio of 400 sm3 of natural gas for each m3 of ambient oil.

TABLE 6

Selected Properties of an Over-Saturated 25° API Oil Mixture
Gas Gravity = 0.55
Hydrocarbon Density = 904 kg/m3
Temperature = 90° C.
Gas Added = 400 sm3/m3

| Pressure (kPa) | Dissolved Gas @ Sat'n (sm$^3$/m$^3$ oil) | Free Gas (sm$^3$) | Free Gas Space (m$^3$) | Total Volume (m3) | Total Mass (kg) | Mixture Density (kg/m$^3$) | Vol Gas (frac) |
|---|---|---|---|---|---|---|---|
| 500 | 0.9 | 399.1 | 101.4 | 102.5 | 1007.1 | 9.8 | 0.99 |
| 1,000 | 1.9 | 398.1 | 50.4 | 51.5 | 956.8 | 18.6 | 0.98 |
| 2,000 | 4.1 | 395.9 | 24.9 | 26.0 | 932.8 | 35.9 | 0.96 |

TABLE 6-continued

Selected Properties of an Over-Saturated 25° API Oil Mixture
Gas Gravity = 0.55
Hydrocarbon Density = 904 kg/m3
Temperature = 90° C.
Gas Added = 400 sm3/m3

| Pressure (kPa) | Dissolved Gas @ Sat'n (sm³/m³ oil) | Free Gas (sm³) | Free Gas Space (m³) | Total Volume (m³) | Total Mass (kg) | Mixture Density (kg/m³) | Vol Gas (frac) |
|---|---|---|---|---|---|---|---|
| 3,000 | 6.4 | 393.6 | 16.4 | 17.5 | 925.8 | 52.9 | 0.94 |
| 4,000 | 8.8 | 391.2 | 12.1 | 13.3 | 923.2 | 69.6 | 0.91 |
| 5,000 | 11.2 | 388.8 | 9.6 | 10.7 | 922.3 | 86.0 | 0.89 |
| 6,000 | 13.7 | 386.3 | 7.9 | 9.0 | 922.3 | 102.1 | 0.87 |
| 7,000 | 16.2 | 383.8 | 6.7 | 7.8 | 922.8 | 117.8 | 0.85 |
| 8,000 | 18.7 | 381.3 | 5.8 | 6.9 | 923.6 | 133.2 | 0.83 |
| 9,000 | 21.3 | 378.7 | 5.1 | 6.2 | 924.7 | 148.1 | 0.81 |
| 10,000 | 23.9 | 376.1 | 4.5 | 5.7 | 925.9 | 162.7 | 0.79 |
| 12,000 | 29.2 | 370.8 | 3.7 | 4.9 | 928.6 | 190.6 | 0.76 |
| 14,000 | 34.6 | 365.4 | 3.1 | 4.3 | 931.7 | 216.7 | 0.72 |
| 15,010 | 37.3 | 362.7 | 2.9 | 4.1 | 933.3 | 229.2 | 0.71 |
| 16,000 | 37.3 | 362.7 | 2.7 | 3.9 | 933.1 | 239.7 | 0.69 |

Excess natural gas, beyond the gas dissolved to saturation will exist as free gas such as at 15 MPa where the gas-oil ratio to saturation is about 37 sm³/m³ of oil leaving about 240 sm³ of un-dissolved or free gas. At pressure and temperature the free gas will occupy a determinable volume; at 15 MPa the free gas occupies a volume of 2.9 m³ to a total mixture volume of 3.9 m³ with a gas fraction of 0.69. Conversely, at 500 kPa the 399 sm³ of free gas occupies a volume of 101 m³ to a total mixture volume of 102.5 m³ and a mixture gas fraction of 0.99. Correspondingly, the density of the mixtures is reflected by the volume of free gas and pressure condition where the 400 sm³/m³ oil added natural gas results in a mixture density of 230 kg/m³ at 15 MPa and 9.8 kg/m³ at 500 kPa.

Well servicing applications will also include recovery or placement of solid materials. In many solids natural gas is not sufficiently absorbed or adsorbed such that natural gas will not alter the physical properties of the solid or result in sublimation/evaporation of the solid into the natural gas. Such passive solids include reservoir rock, formation fines, fracturing sand, perforating and milling debris, asphaltenes and many solid treating materials. Within this context, the behavior of the natural gas with selected solids readily produces gas-solid mixtures can include the solids material and the natural gas. Alternatively, solids can be mixed with aqueous, organic or hydrocarbon liquids at surface for placement, or within the well for removal, to form a slurry where the slurry contains a selected natural gas content and composition to impart the desired behavior to the solid-liquid-gaseous mixture.

First Embodiment: Working Fluid Containing Natural Gas and a Delivery Target Material to be Placed in a Well During Well Servicing In a first embodiment, the composition of the well servicing mixture at the servicing conditions is selected and a working fluid comprising natural gas and a delivery target material is prepared such that the mixture contains a free gas phase during the servicing operation to place the delivery target material within the wellbore or reservoir of the well, and contains a free gas phase during the recovery steps of the operation. This embodiment is particularly useful for well servicing operations to place treating material within the wellbore where the treating material must not enter the reservoir, good dispersion of the treating material throughout a wellbore or into a reservoir is desired, or a use of a minimal volume of treating material is desired. Further, the embodiment is useful where at least the gas phase of the recovered surface stream is desired captured at surface; the gas phase is pipeline compatible and the wellhead flow pressure is sufficient to overcome at least the recovery system inlet pressure.

In this embodiment, at common servicing pressures, the natural gas content and composition is controlled to ensure a gas phase exists within the well servicing mixture and to behave as a multiphase mixture during the well servicing operation. The free natural gas content within the well servicing mixture at the servicing conditions may be in the range of 5 vol % to 99 vol %. The injected working fluid can further comprise a well servicing fluid where the well servicing fluid can comprise the delivery treating material. The surface injection pressure and temperature are selected so that the desired free gas content exists within the well servicing mixture to maintain the servicing condition; this state is maintained within the wellbore or reservoir where the material to be placed separates from the well servicing mixture and remains within the wellbore or reservoir. The well servicing mixture, now mostly devoid of the treating material, is then flowed to surface and recovered.

Maintaining the servicing fluid mixture with the free gas phase state during the servicing step is desirable as the gaseous phase permits ready separation of the gas phase from the treating material for deposition. The natural gas within the working fluid, the composition of the natural gas, the composition of the well servicing liquid, the composition of the treating material or combinations thereof are manipulated to maintain the desired free gas phase state. Separation of the treating material from the injected natural gas working fluid at the servicing conditions may be accomplished by a number of processes such as density contrast between the liquid or solid material and the natural gas, or deposition onto contacted surfaces through wetting by a liquid treating material. Dispersion of the treating material within or by the free gas phase into the wellbore or reservoir may allow a smaller quantity of the treating material to be applied, or may provide more efficient or effective coverage of a given quantity of the treating material. Minimizing solubility of natural gas into the treating material may ensure good density contrast for ready separation or effective dispersion within the wellbore or reservoir. Further upon recovery of the well servicing mixture at recovery conditions, the natural gas can be readily separated from the well servicing mixture to produce at least a gas phase fraction for capture. Additionally, as the natural gas returns to the surface, it provides energy by expansion which can further enhance removal of a liquid or solids portion of the servicing fluid by reducing the hydrostatic pressure within the wellbore.

Importantly, selection of the free gas phase volume permits control of the hydrostatic pressure within the wellbore or reservoir. In the case of circulation of a treating material to a desired location within the wellbore, the circulation pressure, for example at the perforations, can be maintained below the reservoir feed pressure to prevent entry of the well servicing fluids into the reservoir, should that effect be desired. For a matrix injection operation, the bottom hole injection pressure to the reservoir can be controlled to ensure feed at above the reservoir feed pressure while also ensuring the bottom hole injection pressure is below the formation fracturing pressure to prevent hydraulic fracturing of the reservoir. During recovery of a matrix injection operation, the reduced hydrostatic resulting from the commingled natural gas will allow additional drawdown to be applied at the reservoir, thereby releasing a greater portion of the capillary trapped liquids, plus providing a larger pressure potential to increase flow rate.

Second Embodiment: Working Fluid Comprising Natural Gas and a Well Servicing Liquid to Remove a Recovery Target Material During Well Servicing A second embodiment involves selecting the composition of the well servicing fluid and creating a working fluid on surface that comprises natural gas and optionally a treating material, and that when injected into the well will mix with a recovery target material to form a well servicing mixture that can be recovered to surface, and which contains a free gas phase during the recovery steps of the operation. This embodiment is particularly useful for well servicing operations to place treating materials (i.e. the delivery target material) and subsequently remove unwanted materials (i.e. the recovery target material) where: the treating material or the unwanted material must not enter the reservoir, good dispersion of the treating material to contact an unwanted material throughout a wellbore or into a reservoir is desired, presence of an expanding gas within the well servicing mixture assists with entrainment, transport or removal of the unwanted material or its reaction product from the wellbore or reservoir, or extended contact time of the treating material on the unwanted material is desired. Further, the embodiment is useful where at least the gas phase of the recovered surface stream is desired captured at surface; the gas phase is pipeline compatible and the wellhead flow pressure is sufficient to overcome at least the recovery system inlet pressure.

In this embodiment, at common servicing pressures, the natural gas content and composition of the natural gas working fluid is controlled to ensure a free gas phase exists within the well servicing mixture produced within the wellbore or reservoir during the well servicing operation. The injected free natural gas content within the well servicing mixture at the servicing conditions may be in the range of 5 vol % to 99 vol %. The injected working fluid contains natural gas and optionally a well servicing fluid that may comprise the treating material. The surface injection pressure and temperature are selected so that the desired free gas content exists within the well servicing mixture at the servicing condition; this state is maintained within the wellbore or reservoir where the unwanted material to be removed mixes with, is entrained by or is displaced by the injected working fluid to form the well servicing mixture. The well servicing mixture with a sufficient free gas phase can then be readily flowed to surface and recovered.

Maintaining the well servicing mixture with the free gas phase state during the servicing step is desirable as the gaseous phase permits velocities and volumes to assist transport the unwanted material from the wellbore. Notably, the increased well servicing mixture volumes resulting from the free gas phase may produce higher velocities than those mixtures without an additional free gas portion. Similarly, for a given well servicing mixture volume, the injection duration may be increased by the free phase natural gas to enhance contact time between the well servicing mixture and the unwanted material Enhanced carrying, entraining or displacing capacity of the natural gas-containing well servicing mixture can be achieved with the natural gas working fluid by adding selected treating materials; such as increasing liquid viscosity with viscosifiers, creating a foam mixture with the natural gas using foamers, or adding chemicals to dissolve, disperse, or react to form transportable products with the unwanted material. The natural gas content in the working fluid, the composition of the natural gas, the composition of the servicing liquid, the composition of the treating material, the composition and state of the unwanted material or combinations thereof can be manipulated to maintain the desired free gas phase state behaviors. Further, upon recovery of the servicing fluids at recovery conditions, the natural gas can be readily separated from the mixture to produce at least a gas phase fraction for capture. Additionally, as the natural gas returns to the surface, it provides energy by expansion which further enhances removal of liquid or solids portion of the servicing fluid by increasing volume, hence velocity, and reducing the hydrostatic pressure within the wellbore.

Importantly, selection of the free gas phase volume permits control of the hydrostatic pressure within the wellbore or reservoir. In the case of circulation of a treating material to a desired location within the wellbore to contact an unwanted material, the circulation pressure, for example at the perforations, can be maintained below the reservoir feed pressure to prevent entry of the well servicing mixture into the reservoir, should that effect be desired. Surface recovery of the circulated well servicing mixture can also be readily accomplished with sufficient free gas to provide a reduced hydrostatic such that the wellhead flowing pressure is sufficient to overcome the recovery system inlet pressure. For a matrix injection operation, the bottom hole injection pressure to the reservoir can be controlled to ensure feed of the natural gas working fluid at above the reservoir feed pressure while also ensuring the bottom hole injection pressure is below the formation fracturing pressure to prevent hydraulic fracturing of the reservoir. During recovery of the matrix injection operation, the reduced hydrostatic resulting from the commingled natural gas will allow additional drawdown to be applied at the reservoir, thereby releasing a greater portion of the capillary trapped liquids or released fines, plus providing a larger pressure potential to increase flow rate.

Third Embodiment: Working Fluid Containing 100% Natural Gas for Removing a Recovery Target Material During Well Servicing A third embodiment involves selecting the gas working fluid composition to be 100% natural gas and creating a well servicing mixture with natural gas and at least one recovery target material contained within the wellbore or reservoir such that the resulting mixture contains a free gas phase during the recovery steps of the operation. This embodiment is particularly useful for well servicing operations to remove unwanted materials (e.g., the recovery target material) where: the unwanted material must not enter the reservoir, simple gas phase assisted displacement or entrainment of the unwanted material is desired, or use of an expanding gas assists with entrainment, transport, displacement, erosion or removal of the unwanted material from the wellbore or reservoir. Further, the embodiment is useful where at least the gas phase of the recovered well servicing mixture is to be captured at surface; the gas phase is pipeline compatible and the wellhead flow pressure is sufficient to overcome at least the recovery system inlet pressure.

In this embodiment, at common servicing pressures, the natural gas composition is controlled to ensure that a free gas phase exists within a well servicing mixture produced within the wellbore or reservoir during the well servicing operation. The well servicing mixture can include the injected natural gas which combines with a liquid or solid recovery target material contained within the well. The applied free natural gas content within the well servicing mixture at the servicing conditions may be in the range of 5 vol % to 99 vol %. As noted the injected working fluid contains only natural gas. The surface injection pressure and temperature are selected so that the desired free gas content exists within the well servicing mixture at the servicing condition; this state is maintained within the wellbore or reservoir where the unwanted material to be removed mixes with, is entrained by or is displaced by the injected natural gas to form the well servicing mixture. The well servicing mixture is flowed from the wellbore or reservoir to surface and recovered.

Injecting natural gas to produce the well servicing mixture with a free gas phase state during the servicing step is desirable as the gaseous phase permits velocities and volumes to assist transport the unwanted material from the wellbore. Carrying, entraining or displacing capacity of the injected natural gas may be improved with increased injection rate and very marginally with increases in pressure to increase density. Further upon recovery of the formed well servicing mixture at recovery conditions, the natural gas can be readily separated from the recovered mixture to produce at least a gas phase fraction for capture. Additionally, as the natural gas returns to the surface, it provides energy by expansion which further enhances transport of liquid or solids portion of the servicing fluid by increasing volume, hence velocity, and reducing the hydrostatic pressure within the wellbore.

Importantly, use of a working fluid comprising 100 vol % natural gas permits control of the hydrostatic pressure within the wellbore or reservoir. In the case of circulation of an unwanted material from a location within the well, the circulating pressure, for example at the perforations, can be readily maintained below the reservoir feed pressure to prevent entry of the well servicing mixture into the reservoir, should that effect be desired. For a matrix injection operation, the bottom hole injection pressure to the reservoir can also be easily controlled to ensure feed of the injected natural gas at above the reservoir pressure while also ensuring the reservoir injection pressure is below the formation fracturing pressure. During recovery of the matrix injection operation, the reduced hydrostatic resulting from the natural gas within the flow stream will allow additional drawdown to be applied at the reservoir, thereby releasing a greater portion of the capillary trapped liquids or released fines, plus providing a larger pressure potential to increase flow rate.

Fourth Embodiment: Sequential Natural Gas Injection with a Well Servicing Fluid to Minimize Servicing Fluid Phase Mixing During Well Servicing A further embodiment relates to well servicing operations using a working fluid comprising natural gas, wherein the working fluid and a well servicing fluid are injected into the wellbore sequentially and mixing between the injected fluids is minimized in order to better maintain the individual behaviors or properties of the injected well servicing fluids and working fluid. This embodiment is particularly useful for well servicing operations to apply treating materials or to remove unwanted materials where: the single phase properties of a well servicing fluid must be maintained, the properties of the working fluid as injected are to be maintained, dispersion of a well servicing fluid is not desired and while control of the hydrostatic is needed to maintain the servicing conditions. Further, the embodiment is useful where at least the gas phase of the recovered surface stream is to be captured at surface; the gas phase contamination may be minimized and pipeline compatible and the wellhead flow pressure can be sufficient to overcome at least the recovery system inlet pressure. In this manner the injected fluids form, when taken as a whole, a heterogeneous phase well servicing mixture within the well. Within a wellbore where the sequential injection method has been applied, a selected volume of natural gas will exist, for example in the upper portion of the wellbore and exhibits a hydrostatic pressure, and a selected volume of well servicing fluid exists in a lower portion of the wellbore and exhibits an additional hydrostatic, the overall hydrostatic will be the sum of the two individual hydrostatic columns. In application of this example, during injection into a 2,100 m wellbore at 10 MPa where a 1,400 m segment of the wellbore is filled with a working fluid containing 100 vol % natural gas and above a 700 m segment of an aqueous servicing fluid: the hydrostatic of the natural gas is determined at 1,070 kPa from an average density of 78.2 kg/m$^3$ and the hydrostatic of the well servicing fluid is 6,870 kPa from an average density of 1,000 kg/m3. At slow injection rates, the frictional losses are minimal and the pressure at 2,100 m is sum of the injection pressure of 10,000 kPa, the natural gas hydrostatic of 1,070 kPa and the well servicing fluid hydrostatic at 6,870 kPa for a total of 17,940 kPa. In this manner the pressure at the base of the wellbore is controlled such that maintaining pressure below a reservoir feed or other servicing condition can be achieved, and while preserving the single phase properties of the well servicing fluid. Further adaptations of sequential injection can include multiple segments of alternating natural gas and well servicing fluids within the wellbore, various segments within the wellbore containing natural gas working fluids that include differing quantities of natural gas, or other possible combinations of natural gas contents and differing well servicing fluids and for the purpose of placing within, or removing from, materials in the wellbore or reservoir.

In a further application example, coiled tubing is used as an injection conduit inside the wellbore, and a liquid phase may be circulated from a wellbore by injection of natural gas into the coiled tubing and the liquid phase is circulated to surface in an annular space between the coiled tubing and the wellbore. When the unwanted liquid phase has been removed, the injection of natural gas is stopped and a reservoir matrix acidizing well servicing fluid (without natural gas) may be injected down the coiled tubing and circulated to perforations at the bottom of the well using a natural gas working fluid, such as a foam, as a displacing fluid. The resulting displaced natural gas in the wellbore is circulated to surface and recovered. Upon displacing/circulation the acidizing well servicing fluid to the perforations, returns annular flow is shut in and the injection of natural gas is continued to pressure the well such that the reservoir feed pressure is exceeded and the acidizing well servicing fluid is forced into the reservoir matrix. Upon injection of sufficient working fluid to completely displace the acidizing well servicing fluid into the reservoir, the natural gas injection may be continued to further displace the acidizing well servicing fluid deeper into the reservoir for a more efficient reservoir stimulation. With the desired placement of the acidizing well servicing fluid in the reservoir, injection of natural gas is ceased and the well shut as needed for the acidizing well servicing fluid to fully react with the reservoir materials. Upon a achieving a sufficient shut in time, the well is opened to recover the spent acidizing well servicing fluid to surface. Initially the well will flow back the injected natural gas filling the wellbore until the wellbore pressure is reduced to below the reservoir flowing pressure and the reservoir begins to produce the injected natural gas and spent well servicing fluid. The natural gas injected within the reservoir will expand with reducing pressure to assist with displacement of the spent well servicing fluid from the matrix pores and may entrain the fluid and any resulting acidizing fines for transport up the annular space to surface for recovery. With sufficient natural gas in the flow stream, the hydrostatic of the flowing return column will be minimal and a high drawdown pressure can be applied to effectively remove the spent well servicing fluid from the matrix.

Fifth Embodiment: Using Reservoir Flow to Contribute to a Circulation Return Stream During Well Servicing In an additional fifth embodiment, flow from the reservoir is maintained during at least a part of a circulation servicing operation such that the reservoir flow contributes to the return stream to enhance removal from the wellbore of the well servicing fluid stream. This embodiment is useful within well circulation operations where an unwanted material is to be removed from a wellbore or reservoir and the reservoir flow pressure is sufficiently high that the well can produce at the well servicing conditions, where the injected natural gas working fluid is minimized by utilizing reservoir gases to assist with the recovery flow, where natural gas injection is constrained to less than an optimal rate, or where capture of the combined injected and native natural gas during a well servicing operation is desired.

In this embodiment, at common servicing pressures, the natural gas content and composition of the natural gas working fluid are controlled to ensure a free gas phase exists within a mixture produced within the wellbore or reservoir such that the servicing circulation pressure is less than the reservoir flow pressure. The working fluid can include at least natural gas and may also comprise a servicing liquid or treating material. The working fluid is injected into the wellbore and combines with a liquid or solid recovery target material (e.g., an unwanted material) contained within the well. When the working fluid is circulated to a servicing point within the wellbore, the working fluid and any of the recovery target material within the wellbore plus fluids or materials produced from the reservoir are commingled to form the well servicing mixture. The free natural gas content within the well servicing mixture at the servicing conditions may be in the range of 5 vol % to 100 vol %. The surface injection pressure and temperature are selected so that the desired free gas content exists within the well servicing mixture at the servicing condition; this state is maintained within the wellbore or reservoir to provide a servicing pressure below the reservoir flowing pressure. This may be prior to or following contact with the unwanted material to be removed which mixes with, is entrained by or is displaced by either of the working fluid or the combined working fluid and produced reservoir fluids. The well servicing mixture is flowed from the wellbore or reservoir to surface and recovered.

EXAMPLES

The following examples are provided for illustration only and are not intended to limit the scope of the disclosure or claims.

Example 1

Using the well servicing equipment 1 (FIG. 1), a method can be applied to remove sulfur deposits from a sour gas well's perforated interval at 2,311 m to 2,321 m, plus an additional interval above the perforations to a depth of 2,231 m for a total treated interval of 90 m. The well contains and produces sour gas at 4 vol % hydrogen sulfide with 7 vol % carbon dioxide. The servicing conditions of the well are: wellbore/reservoir temperature of 60° C., reservoir pressure of 19,600 kPa, reservoir fracturing pressure at 36,000 kPa, with a minimum surface recovery pressure to facilitate pipeline entry at 2,100 kPa. The pipeline inlet specification for composition is compatible with natural gas compositions containing 75% methane or better and may contain hydrogen sulfide, carbon dioxide and natural gas liquids to comprise the remainder of the composition. Overall conditions and requirements of the well for servicing injection and flow back are presented in Table 7.

TABLE 7

| Example 1: Well Servicing Conditions & Description | |
|---|---|
| Well Description | |
| Top Perforations Depth | 2,311 m |
| Base Perforations Depth | 2,321 m |
| # Perforations | 20 |
| Reservoir Top | 2,310 m |
| Reservoir Temperature | 60° C. |
| Reservoir Pressure | 19,600 kPa |
| Wellbore Description | |
| Casing O.D. | 139.7 mm |
| Wall Thickness | 10.54 mm |
| Roughness | 0.04 mm |
| Tubing O.D. | None |
| Wall Thickness | None |
| Tubing Depth | None |
| Servicing Conditions | |
| Servicing Pressure | 32,400 kPa |
| Servicing Temperature | 60° C. |
| Servicing Interval Top | 2,241 m |
| Servicing Interval Base | 2,331 m |
| Target Substance | Sulfur Deposit |
| Well Flow Back Conditions | |
| Bottom Hole Flow Temperature | 60° C. |
| Wellhead Flowing Temperature | 19° C. |

TABLE 7-continued

Example 1: Well Servicing Conditions & Description

Flow Back & Capture Requirements

| | |
|---|---|
| Pipeline Entry Pressure | 2,100 kPa |
| Surface Equipment Pressure Losses | 500 kPa |
| Target Entry Above Pipeline | 200 kPa |
| Minimum Wellhead Flow Pressure | 2,800 kPa |
| 95% Methane Natural Gas Compatible? | Y |
| Maximum Gas Flow Rate | 250 e3m3/day |
| Target Flow Back Pressure Drawdown | 60% |
| Bottom Hole Drawdown Pressure | 7,840 kPa |

The Well Description and Wellbore Description information of Table 7 is extracted from drilling and completion records commonly compiled for wells during their construction. The Servicing Conditions data is typically acquired from information common to the reservoir and area; the Servicing Pressure is set as 90% of the fracturing pressure of the reservoir. Well Flow Back Conditions data are derived from wells in the area, like wells, computer flow simulation studies or general experience. The Flow Back Requirements—Equipment data is based upon the equipment that is to be applied for the flow back operation and knowledge of the operating conditions of the capture pipeline and used to determine the Minimum Wellhead Flow Pressure. In this instance, the Minimum Wellhead Flow Pressure is the sum of the Pipeline Pressure, the Surface Equipment Pressure Losses and the Target Entry Pressure Above Pipeline pressure. The flow back equipment is specified with the knowledge that the injected servicing gas composition is sufficient for entry into the pipeline or processing facility without specialized treating; the separator equipment and flare in this example only serve as back up should the servicing recovery operation not proceed as planned. The Flow Back Requirements—Performance are the controllable targets set for the flow back operation. In this example, the Maximum Gas Flow Rate is set at 250 $e^3$ $m^3$/day and might be a constraint set by the capacity of the flow back equipment or simply the capacity of the natural gas processing facility. The Target Flow Back Pressure Drawdown is typically based on the draw down needed to effectively mobilize and flow fluids from the reservoir during the servicing treatment flow back operation. This may be based upon experience, laboratory flow testing of core samples or computer simulation studies.

For the well servicing operation, the deposited sulfur within the well is to be removed by injecting a sulfur solvent and then displacing to it to depth with a working fluid comprising natural gas, to allow the solvent to soak the sulfur deposit. The injection will serve to place a quantity of the sulfur solvent through the perforations into the reservoir and is to occur at maximum rates to enhance dispersion through the perforations. Upon placing the solvent, the well is to be shut in for about 12 hours for the solvent to react, and then the well will be flowed to remove the injected and dissolved products from the wellbore to evaluate effectiveness of the servicing treatment.

A working fluid containing about 100 vol % natural gas can be used to displace the sulfur solvent into the well in order to permit recovery to, and processing by, the nearby facility without upsetting the facility with contaminants or needing to vent or flare under pressured or contaminated gases. Further, using 100 vol % natural gas as the working fluid will ensure recovery at sufficient pressure to meet the minimum surface recovery pressure for pipeline entry. To complement the use of natural gas and avoid the potential loss of hydrocarbon aromatic based solvents into the natural gas phase, a chemical sulfur solvent is selected, such as an amine-based sulfur solvent typically dissolved into a water or methanol package. Based upon the anticipated sulfur mass of the deposit, the expected sulfur uptake of the chemical sulfur solvent and the wellbore volume involved for the soak, a chemical sulfur solvent volume of 10 $m^3$ is selected.

Without tubing in the well, the chemical sulfur solvent will need to be displaced into the wellbore. Prior to the servicing operation, the well will be flowed to reduce the wellbore pressure as much as possible in preparation for the displacement. Just prior to rigging to the wellhead for the servicing operation the well will be shut in. Given the requirement to ensure the chemical sulfur solvent treating material is dispersed across and into the 10 m of perforations, the initial 8 $m^3$ of the chemical sulfur solvent will be injected as part of the working fluid at maximum rate to provide as large an injection differential across the perforations as possible.

Based upon the provided servicing requirements and conditions, selection of the desired behavior of the well servicing mixture and well servicing fluid composition, the natural gas content and composition of the natural gas working fluid can now be determined to achieve those desired behaviors during the steps of the servicing operation:

1. Inject with a working fluid containing about 100 vol % of natural gas to displace the sour gas from the wellbore into the reservoir and to establish a feed into the reservoir.
2. Inject a working fluid containing natural gas and about 8 $m^3$ of treating chemical sulfur solvent material mixture into the perforations at or near the maximum servicing pressure.
3. End injection of the working fluid containing the treating chemical sulfur solvent material and inject the remaining 2 $m^3$ of treating chemical sulfur solvent material into the wellbore.
4. Displace the treating chemical sulfur solvent material to 2,211 m with the working fluid comprising 100 vol % natural gas at or near the maximum servicing pressure to the perforations.
5. Shut the well in for 12 hours to let the chemical sulfur solvent soak and react.
6. Flow the well to recover the servicing fluids and evaluate the treatment.

This example operation provides LNG as the natural gas source where the commonly available LNG composition is 95 vol % methane with decreasing volumes of ethane, propane and butane accompanied with a nitrogen content of less than 0.2 vol %. Within the inlet composition specification, natural gas from the an LNG source, even if contaminated with reservoir gases, exceeds the facility inlet requirements and can be captured to pipeline. Further, the chemical sulfur solvent treating material applied as the well servicing fluid is water based and formulated to remain within solution in a natural gas environment and commingling with or contacting natural gas will not alter its physical or chemical behavior. Further, the LNG sourced natural gas is passive to the sulfur deposits and is compatible with the sour reservoir gases. In this manner the composition of the natural gas is determined suitable to meet the objective of the well servicing operation. Selecting the content of the working fluid within the servicing operation is determined on an individual basis for each step of the servicing operation. Table 8 provides a summary of results for the selection of natural gas content in each operation. The description of natural gas content selection and considerations for that selection are provided for each operations step in the text following Table 8. The reported surface pressures corresponding to the servicing condition bottom hole pressures can be generated by commercially available multiphase flow simulator programs common in the industry, such as GLEWPro™, using the servicing conditions and injection requirements as provided within this example.

TABLE 8

Example 1: Servicing Injection Steps and Parameters

| Operation | Natural Gas Rate (sm3/min) | Natural Gas Volume (sm3) | Well Servicing Fluid Rate (m3/min) | Well Servicing Fluid Volume (m3) | Gas Injection Ratio (sm3/m3) | Step Injection Volume (m3) | Effective Injection Rate (m3/min) | Surface Pressure (kPa) | Bottom Hole Pressure (kPa) |
|---|---|---|---|---|---|---|---|---|---|
| Establish Feed Rate | 700 | 8,062 | 0 | 0 | N/A | 25.7 | 2.5 | 28,495 | 32,400 |
| Inject Surface Well Servicing Mixture | 700 | 5,600 | 1.0 | 8.0 | 1,400 | 17.4 | 3.5 | 25,908 | 32,400 |
| Inject Well Servicing Fluid | 0 | 0 | 2.0 | 2.0 | N/A | 2.0 | 2.0 | 24,608 | 32,400 |
| End Displace Well Servicing Fluid to 2,211 m | 0 | 4,665 | 0 | 0 | N/A | 24.3 | 0.0 | 16,367 | 32,400 |
| Shut in Well | 0 | 0 | 0 | 0 | N/A | 0.0 | 0.0 | 15,810 | 19,600 |
| Injected Volumes Total | | 19,293 | | 10.0 | | | | | |

Establish Feed Rate—The operational step of establishing a feed rate involves injection of a working fluid comprising 100 vol % natural gas into the wellbore (i.e. without an accompanying well servicing fluid). Natural gas without an accompanying servicing fluid is chosen as all post-well servicing recovered gas, liquids and solids are to be immediately directed to the pipeline. By completing this step with injection of only natural gas, the liquid load for recovery and processing at the nearby facility is minimized. Also, recovered liquid loading in the wellbore to reduce the surface flow pressure during recovery and needed to meet the pipeline inlet pressure is minimized. This injection step serves two further purposes. First, the sour gas is displaced from the wellbore with sweet LNG sourced natural gas back into the reservoir. At a minimum this displacement removes the very poisonous sour gas away from surface to eliminate development of a very hazardous situation should the wellhead leak during the operation. Second, establishing a feed rate into the reservoir matrix prior to injecting the chemical sulfur solvent ensures the well is left in a very manageable state should a sufficient feed rate not be established; only sweet natural gas has been injected. With these considerations, a 100 vol % natural gas working fluid is chosen for injection to establish the feed rate. To complete this step, natural gas is injected at a sufficient volume to fully displace the sour gas from the wellbore requiring a natural gas volume of 8,060 $sm^3$; the quantity required to fill the wellbore volume at the maximum allowable bottom hole pressure of 32,400 kPa; set at 80% of the anticipated fracturing pressure. Injection of the natural gas is completed at a rate comparable to the following natural gas working fluid injection rate. In this instance, the achievable natural gas injection rate for the proposed natural gas injection equipment is 700 $sm^3$/min. At the reservoir with the maximum injection pressure of 32,400 kPa, the effective injection rate is 2.5 $m^3$/min; based upon the pressure-temperature volume factor of 281 $sm^3$ of natural gas required to fill each m3 of downhole space. With determination of injection friction and hydrostatic effects, the anticipated surface injection pressure approaches 28.5 MPa as reported on Table 8.

Inject Natural Gas Working Fluid with Sulfur Solvent—With the wellbore purged of sour gas and a suitable feed rate confirmed, the operational step of injecting working fluid comprising natural gas and a sulfur solvent treating material is begun. The objective of this step is to contact the sulfur deposits within the perforations with the aqueous treating chemical sulfur solvent material. To ensure this treating chemical contacts as many perforations as possible and actually enters the perforation tunnels, injection of the chemical through the perforations and into the reservoir is desired at as high a rate and with as much dispersion across and between the perforations as is possible. The content of the natural gas in the working fluid is determined given the injection equipment capabilities for both natural gas and well servicing injection, the servicing conditions, the composition of the well servicing fluid, the desired behavior of the injected natural gas working fluid and the natural gas composition. In this instance, solubility of natural gas in this aqueous servicing fluid, as provided in laboratory testing reports, is minimal at less than 15 $sm^3/m^3$ liquid and compensation for dissolved gas is not necessary. This is contrary to hydrocarbon based sulfur solvents such as toluene where solubility is high plus significant quantities may disperse into natural gas where they become ineffective. Based upon results of similar well servicing operations within the field and on offsetting wells, a minimum effective total injection rate of 2.1 $m^3$/min is required to provide the necessary chemical solvent perforation coverage. Utilizing the full rate capacity of the natural gas servicing equipment, a rate of 700 $sm^3$/min for the natural gas is initially selected where the injection rate of the well servicing fluid can be varied to achieve different behaviors. Table 9 presents rate and volume combinations available with the 700 $sm^3$/min natural gas injection rate for a range of practical well servicing fluid injection rates. From Table 9 and based upon the optimum combination of resulting mixture injection rates and volumes; a well servicing injection rate of 1 $m^3$/min is selected. This injection rate provides a working fluid injection rate at the reservoir of 3.5 $m^3$/min while the resulting natural gas working fluid volume injected is 27.8 $m^3$ based upon a well servicing fluid volume of 8 $m^3$. Of consideration is a suitable volume content of the treating well servicing chemical sulfur solvent within the mixture, where this mixture has a content of 29% of chemical solvent volume entrained within a 71% gas volume. Such a distribution is believed effective to properly wet the perforations without dispersing the solvent away from the perforations and too deeply into the reservoir. Further, the resulting mixture injection rate of 3.5 $m^3$/min considerably exceeds the minimum mixture injection rate of 2.1 m³/min. As a final consideration, the resulting mixture volume at 27.8 m³ is sufficiently large to cover the perforated interval with entrained fresh solvent and flow entrained fresh solvent volumes through the perforations for a significant time period to maximize effectiveness of the injection. Notably, at these high gas ratios, minimal applied liquid volumes, and relatively high servicing pressures, density of the resulting mixture in this application is a secondary consideration as evidenced by the relatively high injection pressure. Within the well servicing conditions and requirement and the additional application considerations, the content of free natural gas at 71% is selected to form the well servicing mixture with the desired behaviors.

TABLE 9

Rate and Volume Combinations for Natural Gas Working Fluid Injection

| Injection Rates | | | Properties at Servicing Conditions | | | | |
| --- | --- | --- | --- | --- | --- | --- | --- |
| Natural Gas Injection Rate sm3/min | Well Servicing Fluid Injection Rate m3/min | Gas Added to Liquid Ratio sm3/m3 liq | Mixture Injection Rate m3/min | Effective Gas Volume m3 | Mixture Volume m3 | Mixture Volume to Inject m3 | Mixture Gas Content vol% |
| 700 | 0.25 | 2800 | 2.7 | 9.9 | 10.9 | 87.4 | 91% |
| 700 | 0.50 | 1400 | 3.0 | 5.0 | 6.0 | 47.7 | 83% |
| 700 | 1.00 | 700 | 3.5 | 2.5 | 3.5 | 27.8 | 71% |
| 700 | 1.50 | 467 | 4.0 | 1.7 | 2.7 | 21.2 | 62% |
| 700 | 2.00 | 350 | 4.5 | 1.2 | 2.2 | 17.9 | 55% |

Injected Well Servicing Fluid Volume = 8 m3

To complete this servicing step, injection of the natural gas and the well servicing fluid is undertaken where the natural gas is injected concurrently with the well servicing fluid at a natural gas ratio of 700 sm³/min for each m³ of well servicing fluid. This injection displaces all previously injected natural gas into the reservoir upon injecting the equivalent wellbore volume where the injection continues until a total of 8 m³ of well servicing fluid and 5,600 sm³ of natural gas are pumped. A surface injection pressure of 25.9 MPa is applied to a full wellbore column of the natural gas working fluid to maintain the desired bottom hole servicing pressure of 32.4 MPa.

Inject Well Servicing Fluid—

Upon completing injection of the working fluid containing natural gas and sulfur solvent into the wellbore, injection of natural gas is ceased and the well servicing utility pump continues to inject the remaining 2 m3 of the chemical sulfur solvent servicing fluid. Injection of this fluid is completed at maximum capacity for the well servicing utility pump at 2 m³/min to form a continuous column within the wellbore with minimal density bypass through the existing wellbore content.

Displace Well Servicing Fluid to 2,211 m—

Immediately following injection of the well servicing fluid at surface, maximum rate natural gas injection is re-established at a 100 vol %. This injection serves to displace the just injected well servicing sulfur solvent to the desired position within the wellbore, with a fluid top at 2,211 m; optimally 1.1 m3 remaining in the wellbore and 0.9 m³ displaced into the reservoir. As a result, the injection also fully displaces the remaining previously injected working fluid with natural gas and sulfur solvent into the reservoir. A working fluid containing about 100 vol % of natural gas can be selected for the displacement in order to ensure the wellbore is left with a content that can be recovered directly to the pipeline, will ensure sufficient wellhead pressure upon recovery to meet or exceed pipeline entry pressure, and if mixed with the sulfur solvent during displacement will readily separate to leave a continuous liquid column in the wellbore for the soak, will not dissolve into or dilute the sulfur solvent to reduce the reactivity and is non-toxic as the recovery is to begin and is stabilized. Displacement of the well servicing fluid to a proper position using natural gas and due to gas expansion upon ceasing injection requires the injection to meet the desired end condition. In this step the top of the servicing fluid is to be located at 2,211 m, 20 m above the target depth to ensure full coverage of the desired soak depth is met. This column is to be in pressure equilibrium with the reservoir at 19,600 kPa to complete the soak. Above the well servicing column will be the injected natural gas which will serve to displace the well servicing fluid plus maintain the pressure balance between the reservoir and the wellbore column of sulfur solvent; the hydrostatic of the well servicing fluid column to 2,211 m plus the hydrostatic of the natural gas column to surface plus the shut-in surface pressure will serve to produce the pressure balance. To meet these requirements, the injected volume of natural gas is selected to meet both the pressure and displacement volume targets. Simulation of the target equilibrium shut-in conditions provides a shut-in wellhead pressure of 15,810 kPa, with a column of natural gas providing a hydrostatic of 2,810 kPa for a pressure of 18,620 kPa at 2,211 m. The column of well servicing fluid to the perforations then provides a hydrostatic of about 980 kPa for a total hydrostatic of 19,600 kPa. Volume of the natural gas column is that from surface to 2,211 m at 24.3 m³. With, on average, 192 sm³ of natural gas required to fill each m³ of wellbore space at these conditions and the required injected volume of natural gas is 4,665 sm³. To this target injection volume, natural gas is injected at maximum rates at an anticipated surface pressure of 16,367 kPa to maintain a bottom hole pressure of 32,400 kPa during the injection. Upon injecting the 4,665 sm³ of natural gas, injection is stopped where the natural gas will continue to expand to reach pressure equilibrium with the reservoir leaving the well servicing fluid at or near 2,211 m. In this manner, natural gas is injected to displace the well servicing fluid to the desired depth.

Shut in Well—

With the displacement step completed, the well is shut-in, pressures allowed to equilibrate and the chemical sulfur solvent treating material left to soak for 12 hours. As planned for in the previous displacement step, the well will contain well servicing fluid at or near 2,211 m through to the at least the base of the perforations which is under a column of sweet natural gas at a surface pressure near 15, 800 kPa.

Overall injection into the well totals almost 20,000 sm³ of natural gas and 10 m3 of aqueous based chemical sulfur solvent treating material.

Recovery and Evaluation—

Following the shut-in period, the well is flowed to pipeline to recover the well servicing treatment to surface and evaluate the performance results. Initial condition and contents of the well are as described for the equilibrium shut-in conditions above. Recovery to the pipeline will be within the constraints of the provided flow back conditions. In this example a 60% draw down target is selected to maximize possible removal of any remaining sulfur deposits and to provide sufficient differential pressure to draw injected sulfur solvent servicing fluid from the reservoir. The resulting pressure differential between the reservoir and the wellbore at 60% drawdown is 11,760 kPa at a bottom hole flowing pressure of 7,840 kPa. The flow back equipment deployed to direct the recovery stream to the pipeline will cause a pressure drop of at least 500 kPa with a target entry pressure above pipeline of 200 kPa such that the minimum wellhead flowing pressure during recovery is 2,800 kPa to meet the pipeline inlet pressure target. Due to the toxic nature of the hydrogen sulfide within the well, all recovered gases, fluids and materials are to be directed to the pipeline for processing at the nearby sour gas plant. Initial drawdown will limited 30% as the wellbore is cleared of the spent well servicing fluid liquid with an estimated reservoir flow rate of 100 e³ m³/day of natural gas at that drawdown. Accompanying that gas from the reservoir will be the small portion of liquid injected without natural gas, plus that liquid injected with natural gas at a ratio of 700 sm³/m³. As the initial recovery sequence, a worst case scenario, the wellbore is presumed to contain a 180 m column of the aqueous based sulfur solvent liquid at surface above 2,135 m of injected and reservoir gas commingled with the additional recovered aqueous liquid from the reservoir. The natural gas ratio to the liquid in the commingled column can be about 350 sm³/m³, where gas mobility for flow from a reservoir is generally better than liquid, such that the flow ratio can be greater than 700 sm³/m³. Importantly, this sensitivity calculation is completed to ensure surface flowing pressure exceeds the capture target pressure of about 2,800 kPa. Simulation of this recovery flow results in a wellhead pressure of about 5,780 kPa, and as a worst case scenario, is well in excess of the target. As the column of aqueous liquid is recovered from the wellbore, the surface flowing pressure will improve to 7,540 kPa with complete liquid column recovery. With continued liquid recovery the liquid recovery rate will decrease until it reaches an inconsequential value and the well is flowing virtually 100% natural gas; injected and or reservoir. As the liquid recovery declines, the well gas flow can be progressively increased towards the target drawdown pressure, where at about 60% drawdown the anticipated reservoir flow rate of about 250 e³ m³/day. At these conditions the bottom hole flow pressure of about 7,840 kPa can result in a wellhead flowing pressure of about 6,645 kPa, well above the pipeline entry target.

In this example the application and recovery of a working fluid comprising natural gas applied in a free phase is shown to effectively meet the objectives of the well servicing operation; the treating chemical sulfur solvent is injected to and through the perforations, the treating chemical sulfur solvent is placed over the desired interval, both towards effective removal of the sulfur deposits, and the applied servicing fluids and reaction products are recovered to surface at sufficient pressure and of a composition to permit their capture directly to the pipeline for processing at the nearby sour gas facility. Throughout the operation a closed system application is deployed with zero venting or flaring, plus the operation is completed with the wellbore free of the toxic sour gas by injecting natural gas to purge the wellbore.

Example 2

Using well servicing equipment 1 (FIG. 1), a method can carried out with an objective to acid wash a wellbore string in preparation for a matrix acid injection treatment to be completed the next day. The well has been left free of liquids as the result of a previous servicing operation. The servicing conditions of the well are: wellbore/reservoir temperature of 50° C., reservoir pressure of 12,800 kPa, reservoir fracturing pressure at 28,500 kPa, with a minimum surface recovery pressure to facilitate pipeline entry at 5,000 kPa. The pipeline inlet specification for composition requires natural gas containing greater than 85% methane; with less than 2% carbon dioxide and less than 1% nitrogen. Overall conditions and requirements of the well for servicing injection and flow back are presented in Table 10.

TABLE 10

Example 2: Servicing Conditions & Description

| Well Description | |
|---|---|
| Top Perforations Depth | 1,498 m |
| Base Perforations Depth | 1,502 m |
| # Perforations | 20 |
| Reservoir Top | 1,497 m |
| Reservoir Temperature | 50° C. |
| Reservoir Pressure | 12,800 kPa |
| Wellbore Description | |
| Casing O.D. | 114.3 mm |
| Wall Thickness | 9.85 mm |
| Roughness | 0.04 mm |
| Tubing O.D. | 73.0 mm |
| Wall Thickness | 0.04 mm |
| Tubing Depth | 1,500 mm |
| Servicing Conditions | |
| Servicing Pressure | 12,150 kPa |
| Servicing Temperature | 38° C. |
| Servicing Interval Top | 0 m |
| Servicing Interval Base | 1,502 m |
| Target Substance | Rust |
| Well Circulation Returns Conditions | |
| Bottom Hole Flow Temperature | 38° C. |
| Wellhead Flowing Temperature | 33° C. |
| Flow Back & Capture Requirements | |
| Pipeline Entry Pressure | 5,000 kPa |
| Surface Equipment Pressure Losses | 350 kPa |
| Target Entry Above Pipeline | 100 kPa |
| Minimum Wellhead Flow Pressure | 5,450 kPa |
| 95% Methane Natural Gas Compatible? | Y |
| Maximum Gas Flow Rate | 200 e3m3/day |
| Circulating Pressure below Reservoir | 10% |
| Circulating Pressure @ 1,500 m | 12,150 kPa |

For the well servicing operation, rust is to be removed from the tubing and casing of the well by circulation of a mild acid solution with injection down the tubing and recovery up the tubing annular space. Circulation for the acid wash will be completed at an applied circulation pressure of 12,150 kPa at the base of the tubing; approximately 5% lower than the reservoir pressure to ensure none of the acid wash chemical, spent acid or acid wash products enter and damage the reservoir. Circulation returns are to be recovered to surface through the flow back system of FIG.

1 with the injected natural gas separated from the returning flow stream and directed to pipeline for capture. The acid wash circulation fluids are to be displaced from the wellbore with natural gas. This example operation again provides LNG as the natural gas source where the commonly available LNG composition is 95 vol % of methane with decreasing volumes of ethane, propane and butane accompanied with a nitrogen content of less than 0.2 vol %. The composition meets the pipeline inlet gas composition. Further, the mild acid wash solution treating material applied as the well servicing fluid is water based and commingling with or contacting natural gas will not alter its physical or chemical behavior. Further, the LNG sourced natural gas is passive to the rust target material. In this manner the composition of the servicing natural gas is determined suitable to meet the objective of the well servicing operation. Determination of the natural gas content to form the working fluid is accomplished with the use of a multiphase simulator with results of the simulation presented on FIG. 8. These traces reflect results from injection of the well servicing fluid commingled with natural gas at a ratio of 200 $sm^3/m^3$ liquid where natural gas is injected at a rate of 100 $sm^3$/min with the well servicing fluid injected at 0.5 $m^3$/min. Referring to the injection pressure curve plotted against a horizontal wellbore pressure axis and a vertical wellbore depth axis, the pressure at all points along the wellbore are shown. The injection pressure at surface is seen to be 6,771 kPa with the target bottom hole circulating pressure of 12,150 kPa met. Referring to the injection density curve, a density range from 315 $kg/m^3$ at injection through to 428 $kg/m^3$ at bottom hole results from the density reduction with the use of natural gas. A comparable result without natural gas and only the mild acid well servicing fluid would be a consistent density at or near 1,000 $kg/m^3$ and a bottom hole circulating pressure approaching 15,000 kPa; much in excess of the specified servicing conditions. The recovery pressure curve shows similar behavior to the injection curve with a predicted surface flowing pressure of 6,358 kPa, exceeding the required wellhead flowing pressure of 5,450 kPa. The resulting recovery density range at surface is as low as 274 $kg/m^3$, again clearly illustrating density reduction achieved with use of natural gas. In this manner, the injected natural gas content is selected at a ratio of 200 $sm^3/m^3$ to provide the desired behavior of the well servicing mixture. The mixture is prepared by concurrently pressuring the natural gas and well servicing fluid to injection pressure at the specified ratio, combining the pressured fluid streams and then directing them into the tubing within the wellbore using well servicing equipment 1. As the circulated fluids are returned to surface, the flow stream is choked to manage pressure, directed to the flow back system 12, for separation where the gas phase is directed to pipeline for capture, liquids are directed to the flow back tanks and solids accumulate within the separator for subsequent removal treating and disposal.

In this example the application and recovery of natural gas in a free phase is shown to effectively meet the objectives of the well servicing operation; the density of the well servicing fluid is sufficiently reduced by addition of natural gas such that the acid wash treatment is able to be completed at pressures to avoid feed of the well servicing mixture or components to the reservoir. Additionally, the recovery pressure exceeds that needed to permit flow back into the pipeline for capture.

Certain properties of a well servicing mixture are manipulated so that a gas phase exists within the produced mixture at well servicing conditions during the well servicing step of the operation, and a with a gas phase present during the recovery step of the operation, i.e. effluent resulting from the well servicing operation during circulation or effluent after wellbore or matrix injection has ceased and during draw down to prepare the well for production.

In this method, the relative content of free natural gas with the well servicing mixture to form a natural gas servicing mixture is controlled to ensure the natural gas content over saturates the target material resulting in free gas within the mixture during the servicing operation. The natural gas content may be in the range to produce a free gas portion within the well servicing mixture of 5% to 99% by volume. The natural gas may be applied to the well servicing fluid at surface to form the natural gas working fluid or be caused to contact a target material within the wellbore or the underground reservoir with or without a well servicing fluid to form the well servicing mixture.

The free gas containing servicing mixture may exist upon mixing with the target material at the servicing conditions; this state is maintained within the wellbore at the servicing conditions during circulation operations, and through the wellbore and into the underground formation during matrix injection operations.

Creating the well servicing mixture with a free gas phase can further reduce the liquid volume needed for the well servicing operation. Within a matrix injection operation the lesser liquid volume reduces the liquids potentially trapped within the formation and inhibiting native hydrocarbon recovery. Upon ending injection the un-dissolved gas will maintain a free gas phase fraction within the contacted reservoir. The gas phase fraction is expected to produce a highly mobile system within the reservoir matrix and wellbore and exhibit a low liquid content and high recovery factors for the injected well servicing fluid, which is a desirable state before the well is placed on production. Additionally, as the natural gas is expected to return to the surface, it provides energy by expansion which is expected to further enhance removal of the liquid portion of the well servicing mixture by reducing the hydrostatic pressure within the wellbore. The significantly reduced hydrostatic of the commingled natural gas and liquid is expected to allow additional drawdown to be applied at the formation, thereby releasing a greater portion of capillary trapped liquids, plus providing a larger pressure potential to increase flow rate. Such theorized improvements are expected to contribute to successfully servicing shallow formations, formations with potentially high capillary pressures causing liquid blocks, under saturated formations that tend to trap liquids, depleted formations and low permeability formations that require high draw down to move liquids within the reservoir. The two-phase mixture is expected to be particularly adept at removing liquids from the reservoir. The properties of the target material, the natural gas, composition of the natural gas, the servicing liquid and in some cases the treating and target material reaction products are manipulated with the goal of significantly reducing the liquid volume placed within the reservoir, maximizing creation of a gas phase within the formation matrix and minimizing the hydrostatic of the flowing recovery stream. With control of the hydrostatic, the well effluent stream recovery pressure can be controlled to support capture of at least the gas phase to a processing facility without the need to vent or flare.

Similarly, within a well servicing circulation operation, the lesser liquid volume reduces the hydrostatic and permits control of the servicing pressure within a wellbore. In matrix injection operations, pressure control permits injection control such as ensuring matrix injection pressures remain below the fracturing pressure. In circulation operations, pressure control ensures circulation pressures to below the matrix feed pressure. Circulation pressures below the formation feed pressure prevent liquid or solids entry to the formation avoiding incidental damage or plugging of the matrix from materials within the wellbore. Further, the presence of an appropriate gas phase volume in the circulating mixture will permit the well effluent to be flowed to surface at a pressure sufficient to support recovery of at least the gas phase to a processing facility without the need to vent or flare. Additionally, a free gas phase may serve to efficiently disperse or extend coverage a treating material to improve application efficiency.

Creation of free gas phase mixtures using natural gas for well servicing preferentially requires selection of an accompanying servicing liquid and treating material that will not readily dissolve or absorb the accompanying natural gas at application conditions such that free natural gas remains and the servicing liquid or target material remains as a separate phase. Further, the composition of the natural gas is selected to maximize the free gas by minimizing the dissolved gas.

In this manner the natural gas is effectively applied as a gas phase to produce free gas phase mixtures with many liquids and solids and can be utilized to achieve a variety of unique and beneficial purposes. Such purposes include circulation into wellbore containing aqueous liquids to commingle with and displace liquids from a wellbore, or to be mixed with an aqueous liquid to form a foamed fluid either at surface or within a wellbore to efficiently remove wellbore aqueous liquids or wellbore debris. Further, either a workover or treating material, or mixture thereof, may be commingled or foamed with natural gas to extend the gross volume, penetration effect or transport properties for wellbore debris removal or chemical cleaning or reduction in density. Similarly, efficient dispersion, placement or recovery of an aqueous workover or treating fluid with injection into the reservoir can be accomplished with the inclusion natural gas.

Selecting the free gas volume is beneficial to provide a mixture density to allow control of the hydrostatic pressure during a well servicing operation or to assist in recovery following well servicing. This can be deployed to prevent or minimize feed of the servicing fluid into the reservoir or alternatively, to permit flow from the reservoir that can be incorporated into the servicing fluid stream to speed circulation of the servicing products, enhance transport of debris out of the wellbore or to mix with the servicing fluid to enhance flow to surface. The free gas phase may also serve to increase the apparent volume and hence placement of a servicing fluid or treating chemical.

Further, during well servicing operations, circulation or following injection, the natural gas, the accompanying base fluid, treating chemicals, transported materials and reservoir materials can be recovered and at least the applied natural gas directed to processing facilities for re-use or sale.

What is claimed is:

1. A method for servicing a hydrocarbon well using natural gas in a well intervention operation to remove a recovery target material already present in the well, comprising:
   injecting a working fluid into the well, the working fluid comprising 5 volume percent (vol %) to 100 vol % of natural gas;
   mixing downhole in the well at least a portion of the working fluid with at least a portion of the recovery target material already present in the well to form a heterogeneous phase well servicing mixture comprising a gaseous phase natural gas and a solid or liquid phase recovery target material;
   transporting the heterogeneous phase well servicing mixture to a surface of the well using the gaseous phase natural gas as a carrier fluid for the recovery target material; and
   capturing at least a portion of the heterogeneous phase well servicing mixture at the surface to remove the mixed recovery target material from the well.

2. The method of claim 1, further comprising directing, after capturing, at least a portion of the gas phase of the heterogeneous phase well servicing mixture to a pipeline or processing facility.

3. The method of claim 1, wherein the recovery target material is in a liquid state and comprises a well servicing liquid, a fracturing liquid, a completion liquid, water, an accumulated reservoir fluid present in a wellbore of the well, or any combination thereof.

4. The method of claim 1, wherein the recovery target material is in a solid state and comprises produced reservoir rock fines, proppant, milling debris, an asphaltene, a wax, perforating debris, mobilized clays, waxes, emulsions, precipitates, hydrates, or any combination thereof.

5. The method of claim 1, wherein the working fluid comprises a treating substance, and during the mixing of the working fluid with the recovery target material, the treating substance causes at least one of a physical and a chemical change in the recovery target material in the process of forming the heterogeneous phase mixture.

6. The method of claim 1, wherein the working fluid comprises an aqueous liquid, and wherein the aqueous liquid comprises a dissolved salt, an acid, a water soluble organic material, or any mixture thereof.

7. The method of claim 1, wherein the working fluid comprises an organic liquid, and wherein the organic liquid comprises an alcohol, a ketone, an ester, an amide, an aldehyde, a carboxylic acid, an amide, or any mixture thereof.

8. The method of claim 1, wherein the working fluid comprises a hydrocarbon liquid, and the hydrocarbon liquid comprises an alkane, an alkene, an alkyne, an aromatic, or any mixture thereof.

9. The method of claim 1, further comprising determining a natural gas solubility in the working fluid, and injecting the working fluid into the well at a selected injection pressure and injection temperature such that the working fluid comprises a desired free gas volume at selected servicing conditions within the well, and wherein at least a portion of the gaseous phase natural gas is undissolved in a well servicing fluid during the transporting and capturing steps.

10. The method of claim 9, further comprising selecting the injection pressure and injection temperature of the working fluid according to at least one of a target working fluid density, a target total natural gas volume, or a target dissolved natural gas content in the working fluid.

11. The method of claim 1, further comprising selecting a composition of the natural gas such that the heterogeneous phase well servicing mixture contains a free gas phase during the recovering of the heterogeneous phase well servicing mixture.

12. The method of claim 1, further comprising sequentially injecting a well servicing liquid and the working fluid into the well, wherein the working fluid is 100% natural gas, and wherein the heterogeneous phase well servicing mixture comprises the working fluid, the well servicing liquid, and the recovery target material.

13. The method of claim 1, further comprising during the transporting and capturing of at least a portion of the heterogeneous phase well servicing mixture at surface, maintaining a flow from a reservoir during at least a part of a circulating servicing operation such that the reservoir flow contributes to a return stream comprising the heterogeneous phase well servicing mixture.

14. The method of claim 1, wherein the well intervention operation comprises pressure testing of a wellbore, and the method further comprises injecting the working fluid into a closed wellbore to a selected pressure.

15. The method of claim 1, wherein the well intervention operation comprises a purging of a wellbore and the method further comprises injecting or circulating the working fluid in the wellbore to dilute or displace selected gases or liquids therein to a selected level.

16. The method of claim 1, wherein the well intervention operation comprises an injectivity or flow capacity test of the well and the method further comprises injecting the working fluid into a reservoir communicative with a wellbore of the well to flow through a matrix of a reservoir of the well to determine an injectivity or a flow capacity of the reservoir.

\* \* \* \* \*